(12) United States Patent
Tsuji et al.

(10) Patent No.: US 11,463,378 B2
(45) Date of Patent: Oct. 4, 2022

(54) DIGITAL SWITCH, WIRELESS COMMUNICATION DEVICE, CONTROL STATION, AND WIRELESS COMMUNICATION CONTROL METHOD FOR SWITCHING A ROUTE OF COMMUNICATION DATA

(71) Applicant: MITSUBISHI ELECTRIC CORPORATION, Chiyoda-ku (JP)

(72) Inventors: Kazuyoshi Tsuji, Chiyoda-ku (JP);
Akinori Fujimura, Chiyoda-ku (JP);
Yuta Takemoto, Chiyoda-ku (JP);
Shinya Hirakuri, Chiyoda-ku (JP);
Yuichi Yamamoto, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 494 days.

(21) Appl. No.: 16/486,538

(22) PCT Filed: Mar. 6, 2018

(86) PCT No.: PCT/JP2018/008564
§ 371 (c)(1),
(2) Date: Aug. 16, 2019

(87) PCT Pub. No.: WO2018/164119
PCT Pub. Date: Sep. 13, 2018

(65) Prior Publication Data
US 2021/0336900 A1  Oct. 28, 2021

(30) Foreign Application Priority Data
Mar. 6, 2017 (JP) .............................. JP2017-041421

(51) Int. Cl.
*H04L 49/101* (2022.01)
*H04J 3/02* (2006.01)
*H04B 7/185* (2006.01)

(52) U.S. Cl.
CPC .............. *H04L 49/101* (2013.01); *H04J 3/02* (2013.01); *H04B 7/18515* (2013.01)

(58) Field of Classification Search
CPC ...... H04L 49/101; H04J 3/02; H04B 7/18515; H04B 7/2041
See application file for complete search history.

(56) References Cited

U.S. PATENT DOCUMENTS 6,487,171 B1  11/2002  Honig et al.
6,693,903 B1   2/2004  Shively
(Continued)

FOREIGN PATENT DOCUMENTS

EP  2 110 967 A1  10/2009
EP  2 988 432 A1   2/2016
(Continued)

OTHER PUBLICATIONS

Extended European Search Report dated Apr. 29, 2020 in European Patent Application No. 18764545.2, 18 pages.
(Continued)

*Primary Examiner* — Mounir Moutaouakil
(74) *Attorney, Agent, or Firm* — Oblon, McClelland, Maier & Neustadt, L.L.P.

(57) ABSTRACT

Provided is a digital switch including: a plurality of input-side memories, which are arranged in a one-to-one correspondence with a plurality of input ports, and are configured to accumulate time-division multiplexed data; a plurality of output-side memories, which are arranged in a one-to-one correspondence with a plurality of output ports, and are configured to accumulate time-division multiplexed data;
(Continued)

and a switch matrix configured to receive, as input, the time-division multiplexed data read out in every cycle from each of the plurality of input-side memories, and execute routing for selecting, in accordance with a connection control signal received from outside, any one of the plurality of output-side memories such that the time-division multiplexed data read out in every cycle is output from each of the plurality of output ports without causing a difference in delay, to output the time-division multiplexed data.

9 Claims, 20 Drawing Sheets

(56) References Cited

U.S. PATENT DOCUMENTS

| | | | | |
|---|---|---|---|---|
| 6,993,024 | B1* | 1/2006 | McDermott, III | H04L 49/201 370/432 |
| 7,203,203 | B2* | 4/2007 | Clem | H04L 12/6418 370/235 |
| 7,324,537 | B2* | 1/2008 | Samudrala | H04L 49/101 370/414 |
| 7,715,377 | B2* | 5/2010 | Mick | H04L 49/90 370/413 |
| 7,848,251 | B2* | 12/2010 | Jones | H04L 47/10 370/413 |
| 7,978,690 | B2* | 7/2011 | Abel | H04L 49/552 370/413 |
| 7,991,926 | B1* | 8/2011 | Arad | H04L 49/103 370/413 |
| 8,068,541 | B2* | 11/2011 | Thomsen | H04N 19/423 375/240 |

FOREIGN PATENT DOCUMENTS

| | | |
|---|---|---|
| JP | 4667364 B2 | 4/2011 |
| JP | 2016-158284 A | 9/2016 |

OTHER PUBLICATIONS

The partial Supplementary European Search Report dated Feb. 5, 2020, in European Patent Application No. 18764545.2, 16 pages.
Office Action dated Feb. 25, 2021 in corresponding European Patent Application No. 18 764 545.2, 7 pages.
International Search Report dated May 29, 2018 in PCT/JP2018/008564 filed on Mar. 6, 2018.

* cited by examiner

FIG. 5

| INPUT SIDE \ OUTPUT SIDE | 2215 | 2216 | 2217 | 2218 |
|---|---|---|---|---|
| 2211 | 0 | 4 | 4 | 0 |
| 2212 | 2 | 2 | 1 | 3 |
| 2213 | 4 | 1 | 1 | 2 |
| 2214 | 2 | 1 | 2 | 3 |

FIG. 6

| INPUT SIDE \ OUTPUT SIDE | 2215 | 2217 | 2218 |
|---|---|---|---|
| 2212 | 2 | 1 | 3 |
| 2213 | 4 | 1 | 2 |
| 2214 | 2 | 2 | 3 |

FIG. 7

| INPUT SIDE \ OUTPUT SIDE | 2217 | 2218 |
|---|---|---|
| 2212 | 1 | 3 |
| 2214 | 2 | 3 |

FIG. 8

|  | OUTPUT SIDE | 2217 |
|---|---|---|
| INPUT SIDE | | |
| | 2214 | 2 |

FIG. 9

| INPUT SIDE \ OUTPUT SIDE | 2215 | 2216 | 2217 | 2218 |
|---|---|---|---|---|
| 2211 | 0 | 3 | 4 | 0 |
| 2212 | 2 | 2 | 1 | 2 |
| 2213 | 3 | 1 | 1 | 2 |
| 2214 | 2 | 1 | 1 | 3 |

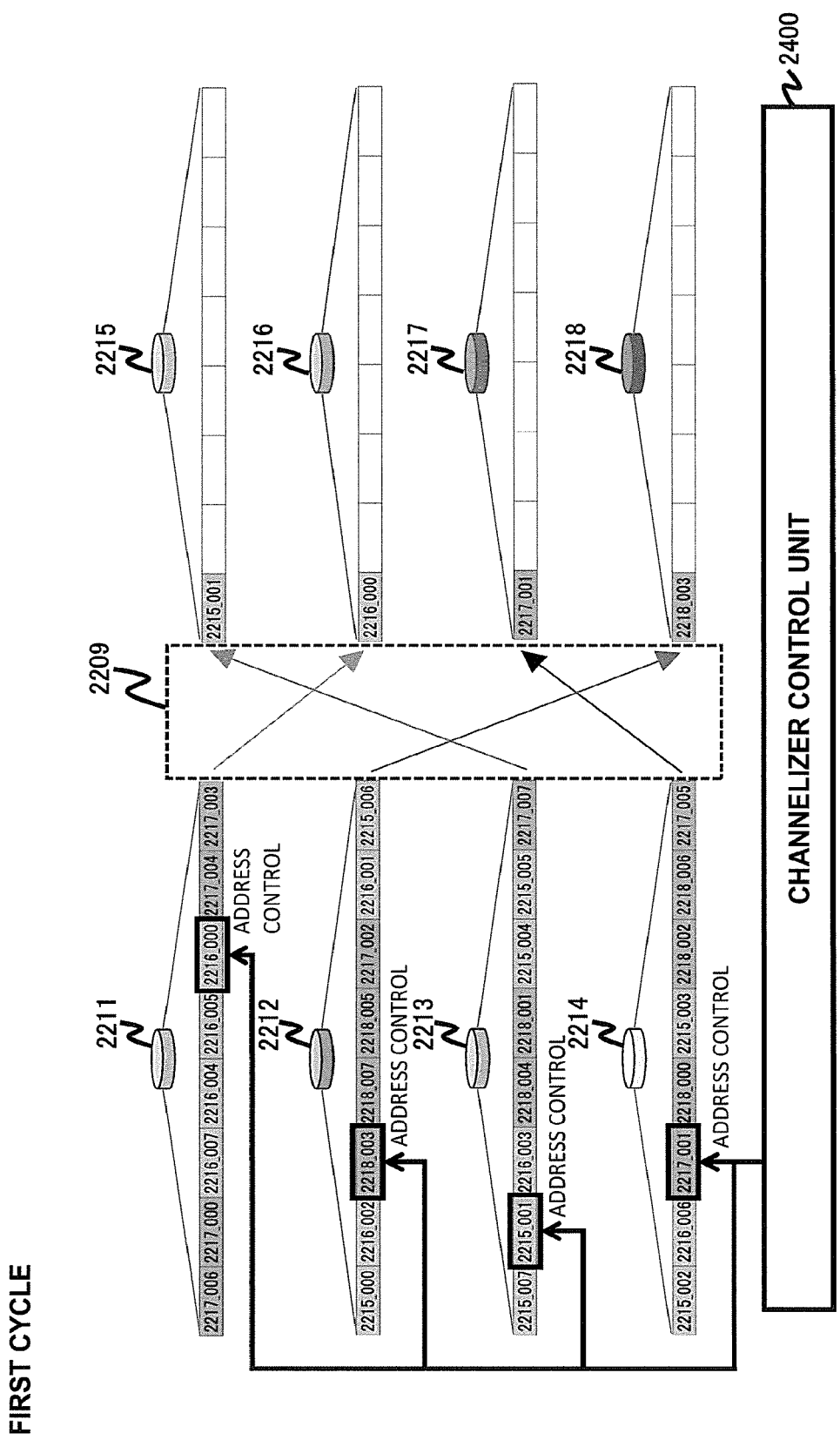
FIG. 11A FIRST CYCLE

SECOND CYCLE

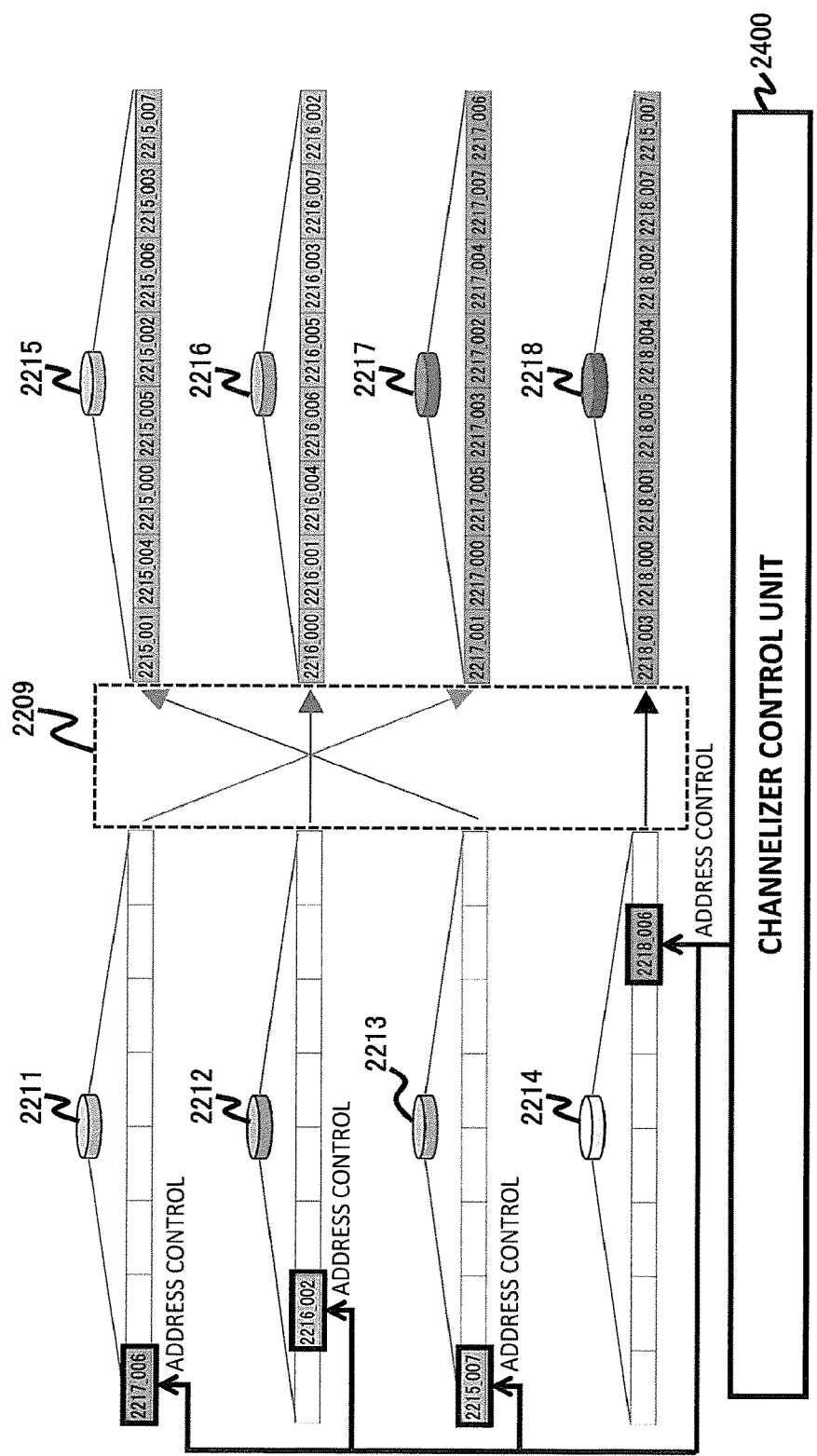

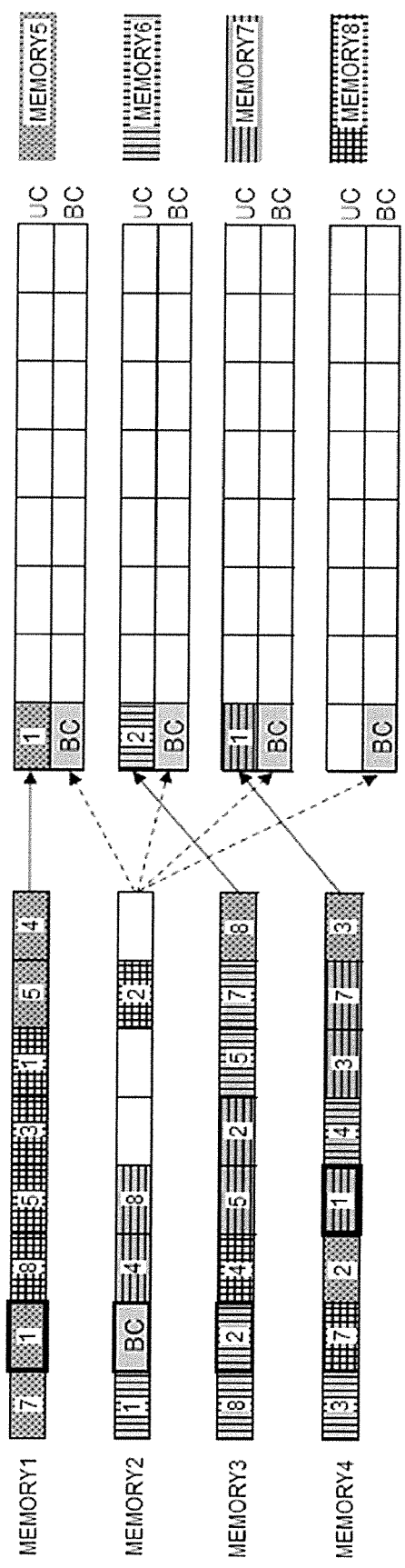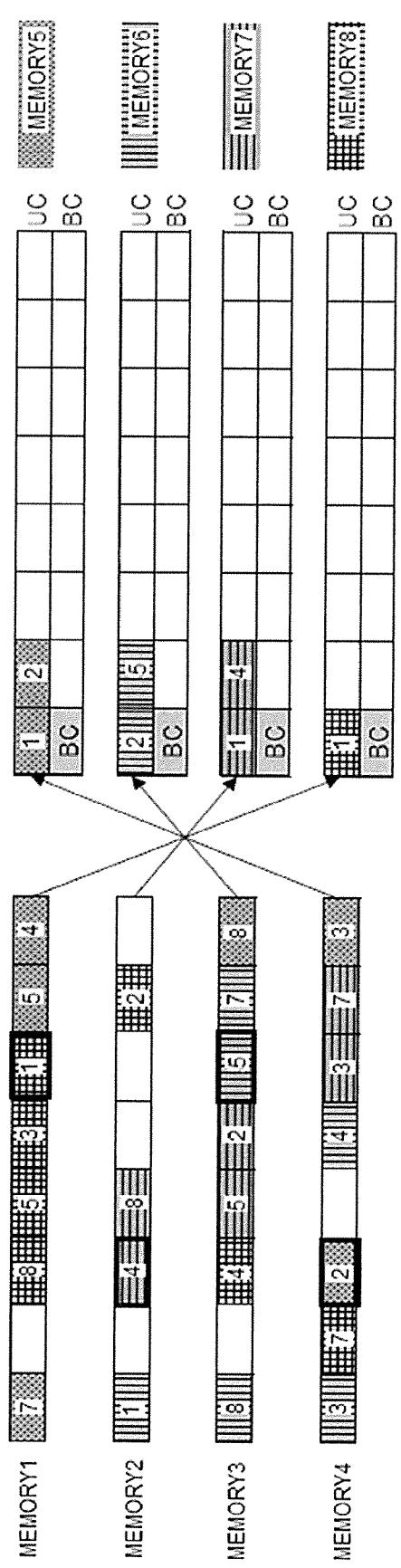
FIG. 16A
FIG. 16B

DIGITAL SWITCH, WIRELESS
COMMUNICATION DEVICE, CONTROL
STATION, AND WIRELESS
COMMUNICATION CONTROL METHOD
FOR SWITCHING A ROUTE OF
COMMUNICATION DATA

TECHNICAL FIELD

The present invention relates to a digital switch, a wireless communication device, a control station, and a wireless communication control method, for switching a route of communication data.

BACKGROUND ART

In satellite communication systems, with the increasing demand for broadband communication, there is a need for a multi-beam satellite communication system handling several tens of beams. In such a system, in the case of increasing the flexibility of frequency assignment by varying a signal bandwidth assigned to each beam area, a relay unit using a digital channelizer is effective.

The digital channelizer includes a plurality of digital demultiplexing units, a plurality of digital multiplexing units, and a digital switch matrix unit.

For example, there has been proposed a method of implementing the digital switch matrix by arranging a plurality of switching modules (ASICs) in a grid (see, for example, Patent Literature 1). Each switching module in Patent Literature 1 has a 2-input 2-output data bus interface, and the digital switch matrix is implemented by interconnecting a plurality of those switching modules in a grid.

CITATION LIST

Patent Literature

[PTL 1] JP 4667364 B2

SUMMARY OF INVENTION

Technical Problem

However, the related art has the following problems.

There is assumed a case in which the grid-like (also known as "Banyan type") digital switch matrix described in Patent Literature 1 is applied to a multi-beam satellite communication system handling several tens of beams. In this case, as the number of beams (or number of ports) increases, the number of switching modules or the data bus speed between the modules increases. For this reason, an increase in circuit size, an increase in number of wires between modules, and an increase in power consumption become problems.

As a problem specific to grid-like digital switch matrices, there is a problem in that, during routing, a difference in time delay may occur depending on the number of switching modules through which data passes, such as data passing through three switching modules in one routing, and data passing through four switching modules in another routing.

Therefore, for a communication system in which such a difference in delay generated during routing is not permitted, it is required to separately provide a buffer (memory) for absorbing the difference in delay in each switching module or the like. Therefore, an increase in circuit size and an increase in power consumption occur.

In order to implement the desired routing, it is required to apply different settings to all the switching modules. For this reason, when the number of switching modules increases together with the increase in number of beams, the calculation time required until each setting value is calculated becomes very larger, which may affect the operation of the system.

The present invention has been made to solve the above-mentioned problems. It is an object of the present invention to obtain a digital switch, a wireless communication device, a control station, and a wireless communication control method, which are capable of implementing, even for a multi-beam satellite communication system handling several tens of beams, a digital switch matrix having a small circuit size and a low power consumption without differences in delay occurring in each routing, and also capable of calculating a setting value for implementing a desired routing in a short period of time without affecting an operation of a system.

Solution to Problem

According to one embodiment of the present invention, there is provided a digital switch including: a plurality of input-side memories, which are arranged in a one-to-one correspondence with a plurality of input ports, and are configured to accumulate time-division multiplexed data acquired in units of input ports; a plurality of output-side memories, which are arranged in a one-to-one correspondence with a plurality of output ports, and are configured to accumulate time-division multiplexed data to be output in units of output ports; and a switch matrix, which is arranged between the plurality of input-side memories and the plurality of output-side memories, and is configured to receive, as input, the time-division multiplexed data read out in every cycle from each of the plurality of input-side memories, and execute routing for selecting, in accordance with a connection control signal from outside, any one of the plurality of output-side memories such that the time-division multiplexed data read out in every cycle is output from each of the plurality of output ports without causing a difference in delay, to output the time-division multiplexed data.

According to one embodiment of the present invention, there is provided a wireless communication device including: the digital switch of one embodiment of the present invention; and a control unit configured to execute, when executing first address control of reading out, in every cycle, suitable data from among pieces of time-division multiplexed data accumulated in the plurality of input-side memories, connection control of outputting the connection control signal to the switch matrix in order to execute the routing, and second address control of reading out the time-division multiplexed data accumulated in the plurality of output-side memories by performing the connection control in order of an output number to output the read-out time-division multiplexed data via the plurality of output ports, the first address control, the connection control, and the second address control in accordance with an input/output rule enabling the time-division multiplexed data to be output without causing a difference in delay at each of the plurality of output ports.

According to one embodiment of the present invention, there is provided a control station, which is configured to manage communication traffic, the control station including an input/output rule generator configured to provide the input/output rule to the wireless communication device of one embodiment of the present invention, the input/output rule generator being configured to: generate matrix information in which (input-side memory, output-side memory) is an element from time-division multiplexed data, which is accumulated in a plurality of input-side memories included in the wireless communication device and includes information on an output-side memory and an output number; and generate the input/output rule and provide the generated input/output rule to the wireless communication device, the input/output rule being defined by: a procedure 1 of referring to the matrix information and selecting, as a readout source memory, an input-side memory having the smallest number of output-side memory destinations from among pieces of data accumulated in the plurality of input-side memories; a procedure 2 of selecting, as the readout source memory, when one readout source memory is not determined in the procedure 1, an input-side memory having the largest number of pieces of data with the same output-side memory destination from among a plurality of input-side memories selected in the procedure 1; a procedure 3 of freely selecting, when one input-side memory is not determined in the procedure 2, one readout source memory from among a plurality of input-side memories selected in the procedure 2; a procedure 4 of selecting, as a readout target memory, an output-side memory for which the data has the largest number of destinations from among pieces of data accumulated in the input-side memory selected as the readout source memory in any one of the procedure 1 to the procedure 3; a procedure 5 of performing one cycle of selection of the readout source memory and the readout target memory by repeating the procedure 1 to the procedure 4 such that the time-division multiplexed data individually read out in one cycle from each of the plurality of input-side memories is individually output to a corresponding one of the plurality of output-side memories, and updating the matrix information by subtracting one from each element (input-side memory, output-side memory) of the matrix information corresponding to (calling source memory, calling target memory) selected in one cycle; and a procedure 6 of repeating the procedure 1 to the procedure 5 based on the updated matrix information to complete the selection of the calling source memory and the calling target memory for all cycles of the data accumulated in the plurality of input-side memories.

According to one embodiment of the present invention, there is provided a wireless communication control method to be executed in a wireless communication device, the wireless communication device including: a plurality of input-side memories, which are arranged in a one-to-one correspondence with a plurality of input ports, and are configured to accumulate time-division multiplexed data acquired in units of input ports; a plurality of output-side memories, which are arranged in a one-to-one correspondence with a plurality of output ports, and are configured to accumulate time-division multiplexed data to be output in units of output ports; a switch matrix, which is arranged between the plurality of input-side memories and the plurality of output-side memories, and is configured to receive, as input, the time-division multiplexed data read out in every cycle from each of the plurality of input-side memories, and execute routing for selecting, in accordance with a connection control signal received from outside, any one of the plurality of output-side memories such that the time-division multiplexed data read out in every cycle is output from each of the plurality of output ports without causing a difference in delay, to output the time-division multiplexed data; and a control unit configured to execute first address control of reading out, in every cycle, suitable data from among pieces of time-division multiplexed data accumulated in the plurality of input-side memories, connection control of outputting the connection control signal to the switch matrix in order to execute the routing, and second address control of reading out the time-division multiplexed data accumulated in the plurality of output-side memories by performing the connection control in order of an output number to output the read-out time-division multiplexed data via the plurality of output ports, the wireless communication control method, which is executed by the control unit, including a control step of executing the first address control, the connection control, and the second address control in accordance with an input/output rule enabling the time-division multiplexed data to be output without causing a difference in delay at each of the plurality of output ports.

Advantageous Effects of Invention

According to the present invention, there is included the switch unit configured to receive, as input, the time-division multiplexed data read out in every cycle from each of the plurality of input-side memories, and execute the routing for selecting, in accordance with the connection control signal received from the outside, any one of a plurality of output-side memories such that the time-division multiplexed data readout in every cycle is output from each of the plurality of output ports without causing a difference in delay. As a result, it is possible to obtain the digital switch, the wireless communication device, the control station, and the wireless communication control method, which are capable of implementing, even for a multi-beam satellite communication system handling several tens of beams, a digital switch matrix having a small circuit size and a low power consumption without differences in delay occurring in each routing, and also capable of calculating a setting value for implementing a desired routing in a short period of time without affecting the system operation.

BRIEF DESCRIPTION OF DRAWINGS

FIG. 5 is a table for showing matrix information representing a breakdown of a destination of each output-side memory, which corresponds to each piece of data in each input-side memory, in the first embodiment of the present invention.

FIG. 6 is a table for showing matrix information to be used at a time of performing a second selection in the first embodiment of the present invention.

FIG. 7 is a table for showing matrix information to be used at a time of performing a third selection in the first embodiment of the present invention.

FIG. 8 is a table for showing matrix information to be used at a time of performing a fourth selection in the first embodiment of the present invention.

FIG. 9 is a table for showing matrix information updated, after completion of selection in a first cycle, in order to perform selection in a second cycle in the first embodiment of the present invention.

FIG. 11A is an explanatory diagram for illustrating a state in which the subchannel data accumulated in each input-side memory is accumulated in each output-side memory in the first cycle by executing address control by a channelizer control unit in the first embodiment of the present invention.

FIG. 11C is an explanatory diagram for illustrating a state in which the subchannel data accumulated in each input-side memory is accumulated in each output-side memory in an eighth cycle by executing address control by the channelizer control unit in the first embodiment of the present invention.

FIG. 16A is an explanatory diagram for illustrating a series of steps of processing of a data readout order algorithm in the third embodiment of the present invention.

FIG. 16B is an explanatory diagram for illustrating a series of steps of processing of the data readout order algorithm in the third embodiment of the present invention.

DESCRIPTION OF EMBODIMENTS

Now, a digital switch, a wireless communication device, a control station, and a wireless communication control method according to embodiments of the present invention are described in detail with reference to the drawings. Note that, the present invention is not limited by the embodiments.

First Embodiment

Figure 1:
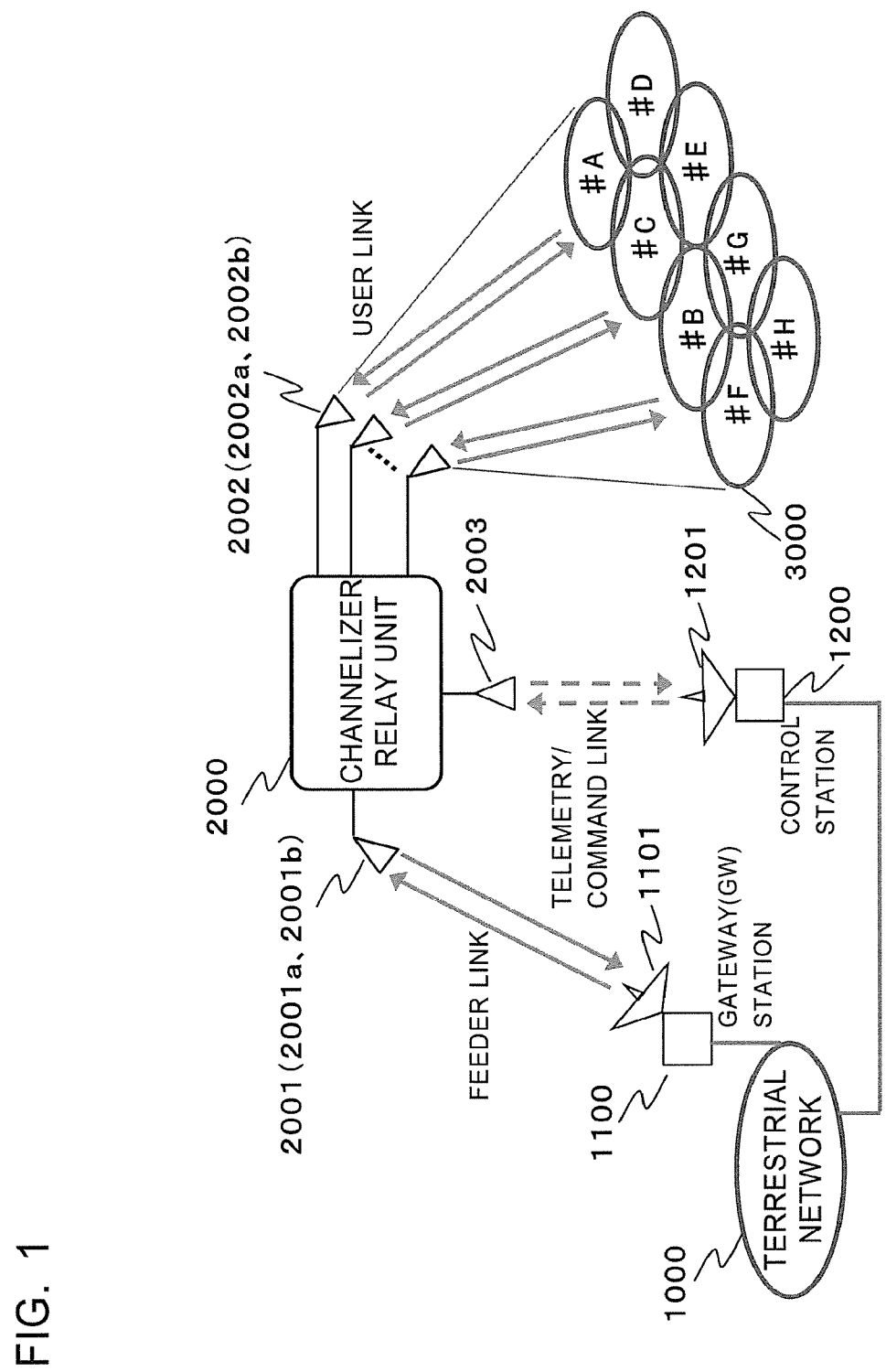
FIG. 1 is a diagram for illustrating a configuration example of a multi-beam satellite communication system in a first embodiment of the present invention.

FIG. 1 is a diagram for illustrating a configuration example of a multi-beam satellite communication system in a first embodiment of the present invention. The multi-beam satellite communication system in the first embodiment includes a terrestrial network 1000, a gateway (GW) station 1100, a control station 1200, a channelizer relay unit 2000, antennas 1101, 1201, and 2001 to 2003, and a beam area 3000.

The antenna 2001 is divided into a transmission antenna 2001a and a reception antenna 2001b. Similarly, the antenna 2002 is divided into a transmission antenna 2002a and a reception antenna 2002b.

In FIG. 1, signals are transmitted from the gateway (GW) station 1100 connected to the terrestrial network 1000 via the channelizer relay unit 2000 to each user terminal present in a plurality of beam areas 3000 (#A to #H) corresponding to service areas. As another example, signals are transmitted from each user terminal via the channelizer relay unit 2000 to the gateway station 1100 or to a user terminal present in another beam area.

The link between the GW station 1100 and the channelizer relay unit 2000 is referred to as "feeder link", and the link between each user terminal and the channelizer relay unit 2000 is referred to as "user link".

When the GW station 1100 transmits a signal, the channelizer relay unit 2000 first receives a plurality of uplink signals from the GW station 1100 at the feeder link reception antenna 2001b. Next, after receiving the plurality of uplink signals, the channelizer relay unit 2000 performs demultiplexing and frequency conversion for a plurality of beam areas. Then, the channelizer relay unit 2000 transmits the signals that have been demultiplexed and undergone frequency conversion from the user link transmission antenna 2002a to each beam area 3000.

In the case in which user terminals transmit a signal, the channelizer relay unit 2000 first receives a communication carrier of an uplink signal of a plurality of user terminals at the user link reception antenna 2002b. Next, after receiving the communication carriers, the channelizer relay unit 2000 performs demultiplexing and frequency conversion for the GW station 1100 and the plurality of beam areas.

Then, the channelizer relay unit 2000 transmits the signals for the GW station 1100 that have been demultiplexed and undergone frequency conversion from the feeder link transmission antenna 2001a to the GW station 1100, and transmits the signals for each beam area 3000 that have been demultiplexed and undergone frequency conversion from the user link transmission antenna 2002a to each beam area 3000.

The control station 1200 issues various commands to the channelizer relay unit 2000 and monitors (perform telemetry on) the channelizer relay unit 2000, and issues network commands and performs control, for example, frequency assignment to the plurality of user terminals present in each beam area 3000.

The control station 1200 also constantly grasps and manages the frequency utilization situation and communication traffic of each carrier. The control station 1200 also performs frequency assignment and issues commands to the channelizer relay unit 2000 when a new communication request is generated from the terrestrial network 1000 or a beam area 3000.

The control station 1200 permits each user terminal to transmit carrier signals and performs frequency assignment at that time to establish a communication link, by receiving a communication request from each user terminal via a radio link or the terrestrial network.

The control station 1200 also controls the channelizer relay unit 2000 as appropriate by using a command/telemetry link. As a result of this control, the channelizer relay unit 2000 determines internal signal processing in accordance with the command signal from the control station 1200, which is received via the antenna 2003.

Figure 2:
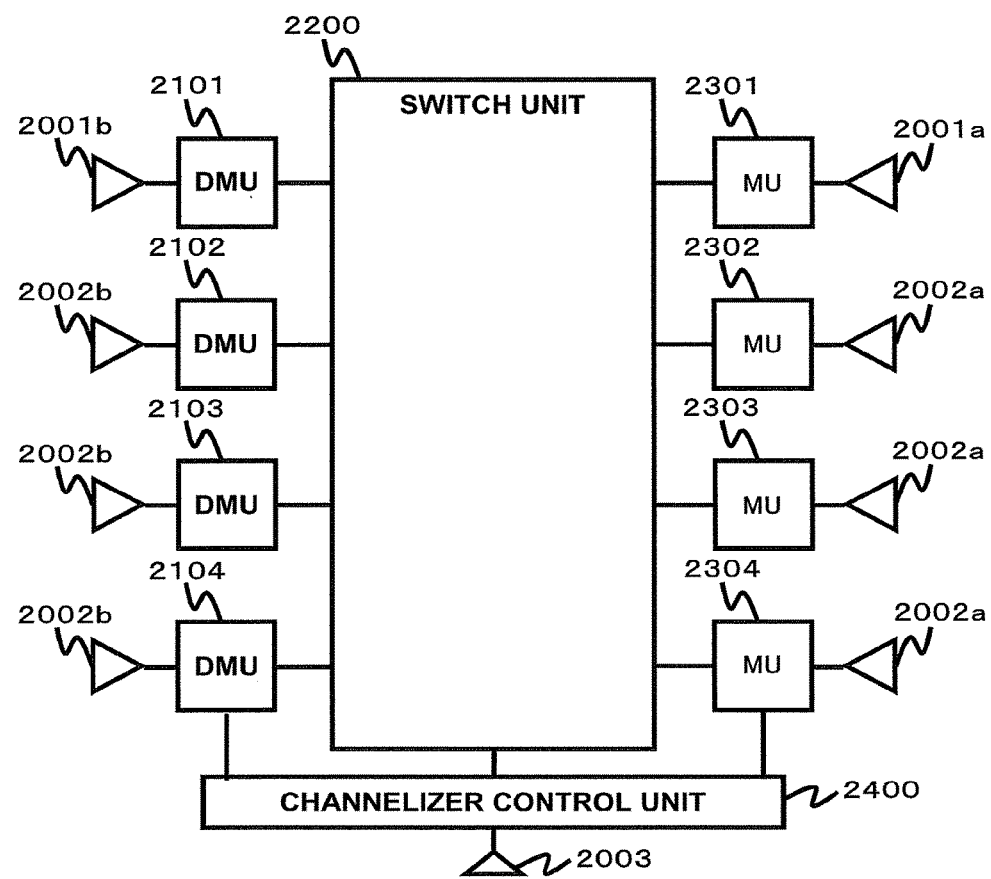
FIG. 2 is a configuration diagram of a channelizer relay unit in the first embodiment of the present invention.

Next, the components of the channelizer relay unit 2000 are described. FIG. 2 is a configuration diagram of the channelizer relay unit 2000 in the first embodiment of the present invention. In FIG. 2, a four-input four-output (4×4) configuration is illustrated as an example, and only the main components are illustrated. However, the configuration of the channelizer relay unit 2000 that may be applied to the present invention is not limited to this. In FIG. 2, parts that are the same as those in FIG. 1 are denoted by the same reference symbols.

The channelizer relay unit 2000 illustrated in FIG. 2 includes a feeder link transmission antenna 2001a, a feeder link reception antenna 2001b, three user link transmission antennas 2002a, three user link reception antennas 2002b, a telemetry/command link antenna 2003, demultiplexing units 2101 to 2104, a switch unit 2200, multiplexing units 2301 to 2304, and a channelizer control unit 2400.

In the following description, the feeder link transmission antenna, the feeder link reception antenna, the user link transmission antennas, the user link reception antennas, and the telemetry/command link antenna are simply referred to as "antennas", and are distinguished by their reference symbol.

The signals received by the antenna 2001b and each antenna 2002b are demultiplexed into a plurality of subchannel data by the corresponding demultiplexing units 2101 to 2104. Each demultiplexed signal is routed to its proper destination via the switch unit 2200, and then transferred to the multiplexing units 2301 to 2304. The multiplexing units 2301 to 2304 multiplex the input subchannel data, combine the multiplexed data into a signal form, and wirelessly transmit the combined signal via the antenna 2001a and each antenna 2002a.

The channelizer control unit 2400 determines internal signal processing in accordance with the command signal from the control station 1200 received via the antenna 2003, and controls the demultiplexing units 2101 to 2104, the switch unit 2200, and the multiplexing units 2301 to 2304.

Figure 3:
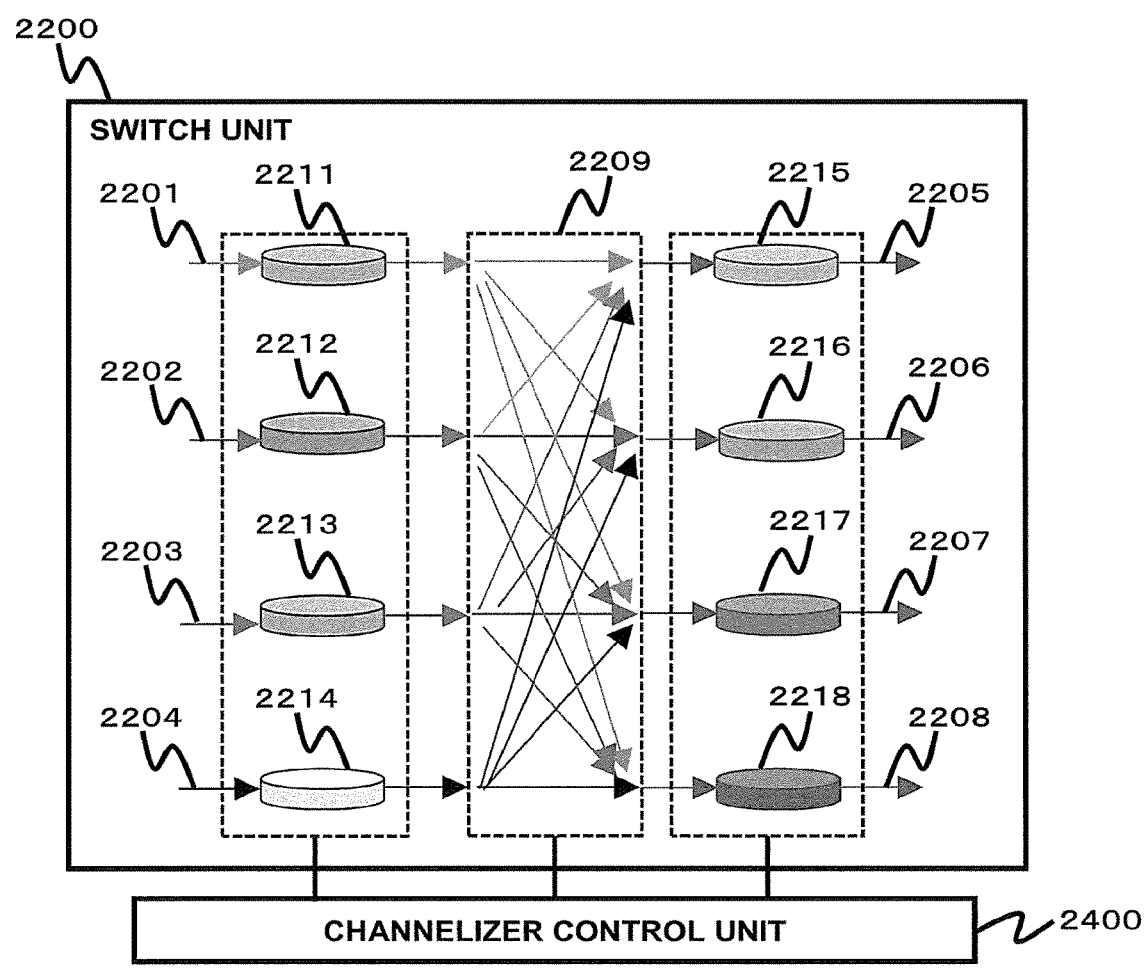
FIG. 3 is a configuration diagram of a switch unit according to the first embodiment of the present invention.

Next, the components of the switch unit 2200 are described. FIG. 3 is a configuration diagram of the switch unit 2200 in the first embodiment of the present invention. The switch unit 2200 illustrated in FIG. 3 includes input ports 2201 to 2204, output ports 2205 to 2208, a switch matrix 2209, input-side memories 2211 to 2214, and output-side memories 2215 to 2218.

The subchannel data demultiplexed by each of the demultiplexing units 2101 to 2104 is input from each of the input ports 2201 to 2204, and accumulated in each of the input-side memories 2211 to 2214. At this time, the subchannel data input and output to and from the switch unit 2200 is time-division multiplexed in units of ports.

The subchannel data (hereinafter referred to as "data") accumulated in each of the input-side memories 2211 to 2214 is read out based on address control from the channelizer control unit 2400. Then, the read-out data is routed to a correct output-side memory by the switch matrix 2209 based on connection control from the channelizer control unit 2400, and accumulated in one of the output-side memories 2215 to 2218.

Then, the channelizer control unit 2400 reads out the data accumulated in the output-side memories 2215 to 2218 in order of subchannel number based on address control, and outputs the read-out data to the multiplexing units 2301 to 2304 via the output ports 2205 to 2208.

As illustrated in FIG. 3, for the switch unit 2200 according to the first embodiment, the required number of memories may be one for each input/output port, and is always twice the number of ports. In contrast, for the switch matrix described in Patent Literature 1, in order to absorb a difference in delay at the time of routing, it is required to arrange a memory in each switching module, and hence the required number of memories is always three times the number of ports.

Therefore, by employing the switch unit of the present invention, the required number of memories can be reduced to two-thirds of that of the related art. As a result, with a digital switch corresponding to the switch unit 2200 of the first embodiment, an effect of larger reductions of the circuit size and the power consumption as compared with the related art can be obtained.

The data accumulated in each of the input-side memories 2211 to 2214 is, for example, cyclically read out in the stated order of the clock cycle. The data in each of the input-side memories 2211 to 2214 read out in every cycle is simultaneously routed to each of the output-side memories 2215 to 2218 by the switch matrix 2209.

However, in the output-side memories 2215 to 2218, it is not possible to simultaneously write the plurality of data to one output-side memory. Therefore, it is required that the channelizer control unit 2400 avoids data collisions by controlling the readout order of the data in the input-side memories so that the output-side memory destinations in each cycle are not duplicated.

Derivation of the readout order is performed by the control station 1200 in accordance with the frequency assignment information. Moreover, the channelizer control unit 2400 performs address control of each of the input-side memories 2211 to 2214 and reads out the data, based on an arithmetic result transmitted from the control station 1200.

At this time, unless the maximum time required to read out the data after the generation of the command from the control station 1200 is suppressed to a practically acceptable level, the system may break. Now, a data readout order derivation procedure satisfying the above-mentioned constraint to be performed by the control station 1200 is described in detail.

Figure 4:
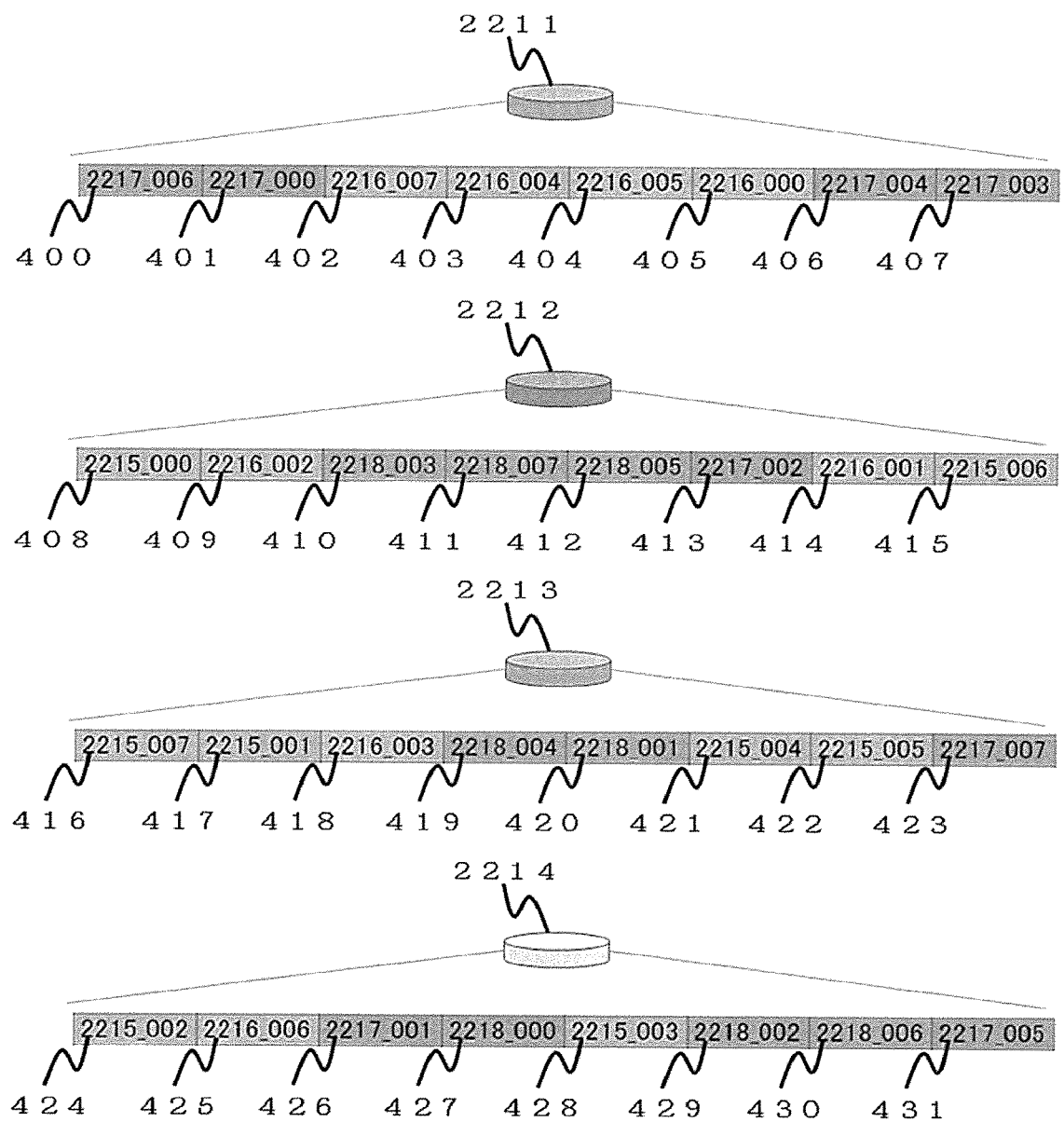
FIG. 4 is a diagram for illustrating a concept of subchannel data accumulated in an address region in each input-side memory in the first embodiment of the present invention.

FIG. 4 is a diagram for illustrating a concept of the subchannel data accumulated in the address region in each of the input-side memories 2211 to 2214 in the first embodiment of the present invention. Each of boxes 400 to 431 in FIG. 4 represents the data stored in each address region of the input-side memories 2211 to 2214. Each piece of subchannel data input from the input ports 2201 to 2204 is accumulated in order from the left in the address region in the input-side memories 2211 to 2214.

The numerals (XXXX_YYY) in each box indicate the number (XXXX) of the output-side memory that is the destination of each piece of subchannel data, and the subchannel number (YYY) on the transmission (downlink) frequency. In this example, in order to simplify the description, there is described an example in which 8:1 demultiplexing is performed, and the value of "YYY" indicating the subchannel number is assumed to be from 000 to 007.

For example, "2217-006", which is the data 400, is transmitted from the GW station 1100 assigned to the first subchannel of the uplink (feeder link), passes via the switch matrix 2209, is accumulated in the output-side memory 2217 (i.e., XXXX=2217), and is output from the output port 2207 as the 7th subchannel of the downlink (i.e., YYY=006).

In order for the control station 1200 to perform frequency assignment by itself, the control station 1200 grasps all pieces of address information (i.e., relationship between each uplink and each downlink subchannel assignment) on the data illustrated in FIG. 4. In order to achieve this, the control station 1200 creates the matrix shown in FIG. 5 based on the information of FIG. 4.

FIG. 5 is a table for showing matrix information representing a breakdown of the destination of each of the output-side memories 2215 to 2218, which corresponds to each piece of data in each of the input-side memories 2211 to 2214, in the first embodiment of the present invention. For example, in the input-side memory 2211, four pieces of data addressed to the output-side memory 2216 and four pieces of data addressed to the output-side memory 2217 are accumulated.

The control station 1200 derives the order in which data is to be read out from each of the input-side memories 2211 to 2214 in accordance with the following procedures based on the matrix information of FIG. 5. Specifically, the control station 1200 selects, from among the four input-side memories 2211 to 2214, the first input-side memory from which data is to be read out in accordance with the following procedures.

(Procedure 1)

First, the control station 1200 selects the input-side memory with the fewest number of destinations among the input-side memories 2211 to 2214. More specifically, the control station 1200 selects the input-side memory with the largest number of O's in the matrix information.

(Procedure 2)

When one input-side memory is not determined in the procedure 1, the control station 1200 selects the input-side memory having the largest number of pieces of data with the same destination (i.e., same destination is most concentrated). More specifically, the control station 1200 selects the input-side memory having the maximum value in the matrix information.

(Procedure 3)

When one input-side memory is not determined even after the procedures 1 and 2 and a plurality of input-side memories remain as selection candidates, the control station 1200 freely selects an input-side memory from among the input-side memories remaining after the procedures 1 and 2. This free selection is performed, for example, by selecting the input-side memory having the smallest reference symbol from among the plurality of input-side memories remaining after the procedures 1 and 2.

Applying the above-mentioned procedures 1 to 3 to the specific example shown in FIG. 5 results in the following. In FIG. 5, the input-side memory 2211 is a memory having two destinations, which is the fewest number of destinations.

Therefore, in accordance with the procedure 1, the input-side memory 2211 is selected as the first data readout source.

More specifically, in the case of FIG. 5, it is possible to identify one input-side memory to be selected by performing the procedure 1, and it is not required to perform the procedure 2 and the procedure 3.

After the input-side memory from which data is to be read out has been selected, the control station 1200 performs the following procedure 4.

(Procedure 4)

Among the data present in the input-side memory selected based on the procedures 1 to 3, the control station 1200 selects the data having the largest number of the same destination as the readout target. More specifically, as the readout target, the control station 1200 selects the data addressed to the output-side memory having the largest value in the matrix.

At this time, when there is a plurality of data having the largest number of the same destination, the control station 1200 freely selects a piece of data. This free selection is performed, for example, by giving priority to, among the plurality of destination data, the piece of data having the smallest reference symbol for the output-side memory to be the destination.

When the procedure of the procedure 4 is applied to the specific example shown in FIG. 5, the input-side memory 2211 selected based on the procedure 1 includes four pieces of data addressed to the output-side memory 2216 and four pieces of data addressed to the output-side memory 2217. Therefore, it is not possible to determine one piece of data having the largest number of the same destination. As a result, of the two output-side memories 2216 and 2217, the control station 1200 selects the data addressed to the output-side memory 2216, which has the smaller reference symbol, as the readout target.

As described above, based on the procedures 1 to 4, the control station 1200 determines the data addressed to the output-side memory 2216 in the input-side memory 2211 as the readout target. In this example, it is assumed that the readout target data is selected by giving priority to the data having the smallest transmission (downlink) subchannel number ("_YYY" portion). Therefore, the control station 1200 selects the data 405 (2216_000) as the readout target data from among the four pieces of data addressed to the output-side memory 2216 in the input-side memory 2211.

Next, the control station 1200 selects the next input-side memory from which data is to be read out and the next data to be read out. At this time, the control station 1200 refers to matrix information obtained by excluding, from the information in the matrix of FIG. 5, the row of the input-side memory (2211) already selected as the data readout source and the column of the output-side memory (2216) that is the destination of the read-out data.

Specifically, the control station 1200 performs a second selection based on matrix information obtained by excluding the row of the input-side memory and the column of the output-side memory corresponding to the first selection result. FIG. 6 is a table for showing the matrix information to be used at the time of performing the second selection in the first embodiment of the present invention. The matrix information of FIG. 6 corresponds to matrix information obtained by excluding the row of the input-side memory 2211 and the column of the output-side memory 2216 from the matrix information of FIG. 5.

Applying the above-mentioned procedures 1 to 4 to the specific example shown in FIG. 6 and performing the second selection result in the following. The control station 1200 selects, based on the matrix information of FIG. 6, in accordance with the procedure 2, the input-side memory 2213 as the next input-side memory from which data is to be read out. More specifically, in the case of FIG. 6, it is not possible to identify one input-side memory to be selected by performing the procedure 1, but it is possible to identify one input-side memory to be selected by performing the procedure 2.

The control station 1200 then determines, in accordance with the procedure 4, that the data 417 (2215001) is to be read out from among the four pieces data addressed to the output-side memory 2215 in the input-side memory 2213.

Similarly, the control station 1200 performs a third selection based on matrix information obtained by excluding the row of the input-side memory and the column of the output-side memory corresponding to the second selection result. FIG. 7 is a table for showing the matrix information to be used at the time of performing the third selection in the first embodiment of the present invention. The matrix information of FIG. 7 corresponds to matrix information obtained by excluding the row of the input-side memory 2213 and the column of the output-side memory 2215 from the matrix information of FIG. 6.

Applying the above-mentioned procedures 1 to 4 to the specific example shown in FIG. 7 and performing the third selection result in the following. The control station 1200 selects, based on the matrix information of FIG. 7, in accordance with the procedure 3, the input-side memory 2212 as the next input-side memory from which data is to be read out. More specifically, in the case of FIG. 7, it is not possible to identify one input-side memory to be selected by performing the procedures 1 and 2, but it is possible to identify one input-side memory to be selected by performing the procedure 3.

The control station 1200 then determines, in accordance with the procedure 4, that the data 410 (2218003) is to be read out from among the three pieces data addressed to the output-side memory 2218 in the input-side memory 2212.

Finally, the control station 1200 performs a fourth selection based on matrix information obtained by excluding the row of the input-side memory and the column of the output-side memory corresponding to the third selection result. FIG. 8 is a table for showing the matrix information to be used at the time of performing the fourth selection in the first embodiment of the present invention. The matrix information of FIG. 8 corresponds to matrix information obtained by excluding the row of the input-side memory 2212 and the column of the output-side memory 2218 from the matrix information of FIG. 7.

Applying the above-mentioned procedures 1 to 4 to the specific example shown in FIG. 8 results in the following. The control station 1200 selects, based on the matrix information of FIG. 8, in accordance with the procedure 1, the one remaining input-side memory 2214 as the next input-side memory from which data is to be read out. In the fourth selection, one input-side memory included in the matrix information has already been identified. Therefore, it can be said that, in the fourth selection of the input-side memory, one input-side memory can be identified without performing the procedures 1 to 3.

The control station 1200 then determines, in accordance with the procedure 4, that the data 426 (2217001) is to be read out from among the two pieces data addressed to the output-side memory 2217 in the input-side memory 2214.

Based on the procedures described above, the control station 1200 completes selection of four pieces of data of the first subchannel (first cycle) to be read out from each of the input-side memories 2211 to 2214. Then, the control station 1200 performs the following procedure 5 in order to perform selection in a second cycle.

(Procedure 5)

The control station 1200 updates the matrix information by subtracting, from the matrix information of FIG. 5, one from the number of output-side memories of each destination corresponding to the four pieces of data selected in the first subchannel.

FIG. 9 is a table for showing the matrix information updated after completion of selection in the first cycle in order to perform selection in a second cycle in the first embodiment of the present invention. More specifically, the control station 1200 generates the matrix information shown in FIG. 9 by subtracting, from the matrix information shown in FIG. 5, one from the number of pieces of data addressed to the output-side memory 2216 in the input-side memory 2211, one from the number of pieces of data addressed to the output-side memory 2218 in the input-side memory 2212, one from the number of pieces of data addressed to the output-side memory 2215 in the input-side memory 2213, and one from the number of pieces of data addressed to the output-side memory 2217 in the input-side memory 2214.

The control station 1200 then completes the selection of the second cycle by repeating the procedures 1 to 4 based on the matrix information of FIG. 9. The control station 1200 also executes the procedure 5 to update the matrix information for the selection of the third cycle.

The control station 1200 completes the derivation of the readout order of all the subchannels by repeating a series of operations based on the procedures 1 to 4 and the procedure 5 by ("number of subchannels"-1) times.

The procedure of deriving the readout order of the subchannel data based on the matrix information shown in FIG. 5 to FIG. 9 has been specifically described above. Next, a more generalized procedure of deriving the readout order of the subchannel data is described in detail with reference to a flowchart using the above-mentioned procedures 1 to 5.

Figure 10:
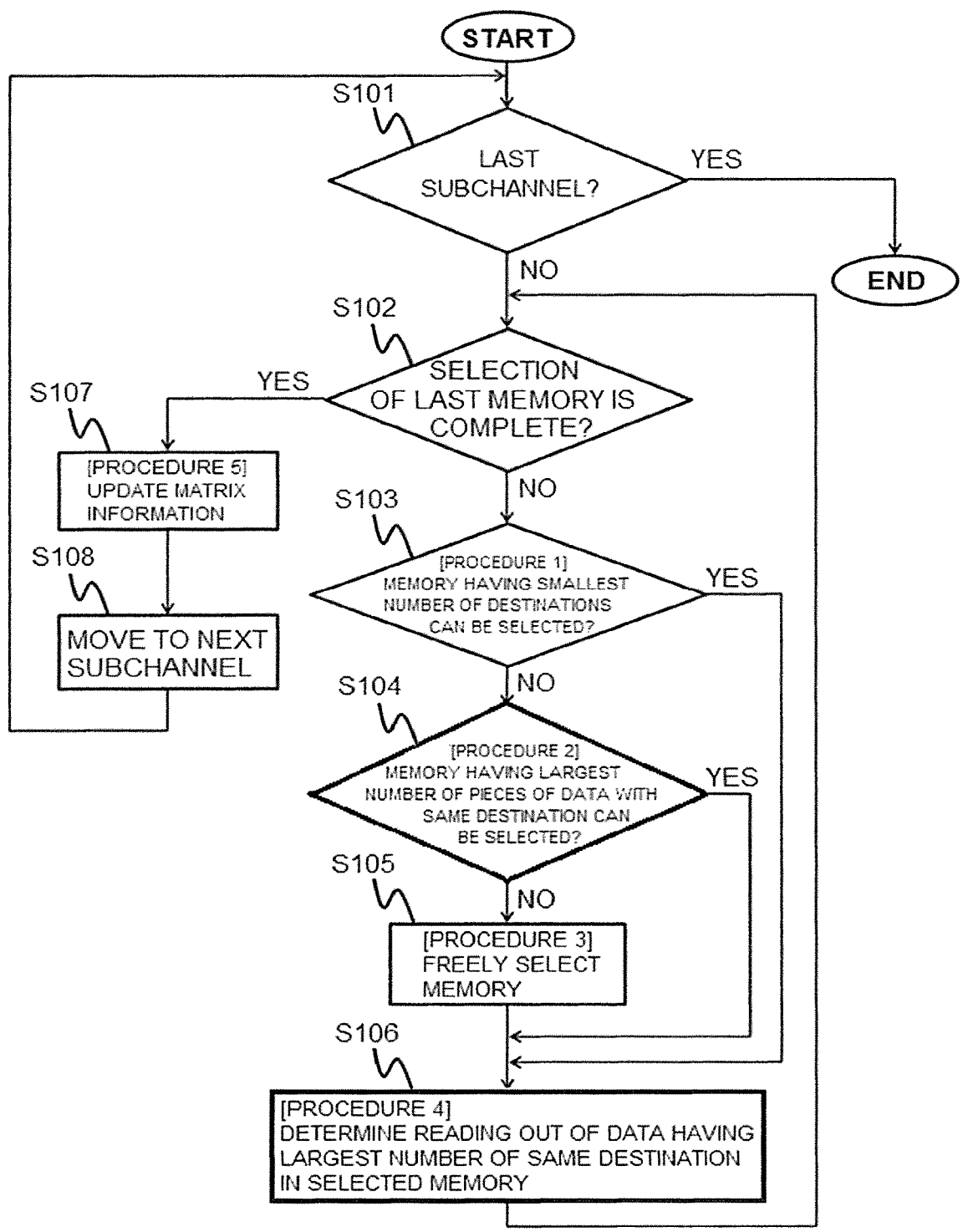
FIG. 10 is a flowchart for illustrating a procedure of deriving a readout order of subchannel data in the first embodiment of the present invention.

FIG. 10 is a flowchart for illustrating the procedure of deriving the readout order of the subchannel data in the first embodiment of the present invention. First, in Step S101, the control station 1200 determines whether or not derivation has been completed up to the data readout order of the last subchannel. When derivation has been completed up to the readout order of the last subchannel, the control station 1200 completes the arithmetic processing of the data readout order derivation (corresponding to case in which "Yes" is determined in Step S101).

Meanwhile, when the derivation of the readout order of the last subchannel is not complete, the processing advances to Step S102 (corresponding to case in which "No" is determined in Step S101).

Next, in Step S102, the control station 1200 determines whether or not selection of the data to be read out from the last input-side memory for the subchannel is complete. When the data to be read out from the last input-side memory has been selected, this means that one cycle of data selection is complete, and thus the processing advances to Step S107 (corresponding to case in which "Yes" is determined in Step S102).

Meanwhile, when selection of the data to be read out from the last input-side memory is not complete, this means that one cycle of selection of all the data is not yet complete, and thus the processing advances to Step S103 (corresponding to case in which "No" is determined in Step S102).

When the processing advances to Step S107, the control station 1200 updates the matrix information in accordance with the above-mentioned procedure 5, and then the processing advances the processing to Step S108. In Step S108, the control station 1200 repeats the data readout order derivation of the next cycle by moving to the next subchannel and returning the processing to Step S101.

Meanwhile, when the processing advances to Step S103, the control station 1200 determines, in accordance with the above-mentioned procedure 1, whether or not one memory having the smallest number of destinations can be selected as the readout source memory from among the input-side memories for which selection of the data to be read out is not complete.

When one readout source memory can be determined, the processing advances to Step S106 (corresponding to case in which "Yes" is determined in Step S103). Meanwhile, when it is not possible to determine one readout source memory, the processing advances to Step S104 (corresponding to case in which "No" is determined in Step S103).

When the processing advances to Step S104, the control station 1200 determines, in accordance with the above-mentioned procedure 2, whether or not one memory having the largest number of pieces of data with the same destination can be selected as the readout source memory from among the input-side memories selected in Step S103.

When one readout source memory can be determined, the processing advances to Step S106 (corresponding to case in which "Yes" is determined in Step S104). Meanwhile, when it is not possible to determine one readout source memory, the processing advances to Step S105 (corresponding to case in which "No" is determined in Step S104).

When the processing advances to Step S105, the control station 1200 freely selects, as the readout source memory, in accordance with the above-mentioned procedure 3, one of the plurality of input-side memories selected in Step S104, and then the processing advances the processing to Step S106. In the first embodiment, in order to simplify the description, it is assumed that the free selection in Step S105 is executed by selecting the memory having the smallest reference symbol.

Next, when the processing advances to Step S106 from anyone of Step S103 to Step S105, the control station 1200 selects, as the readout target, in accordance with the above-mentioned procedure 4, the data having the largest number of the same destination from among the data accumulated in the one input-side memory selected in any one of Step S103 to Step S105.

When executing the selection of Step S106, in the case in which there are a plurality of selection candidates, the control station 1200 freely selects one of those selection candidates. In the first embodiment, in order to simplify the description, it is assumed that the free selection in Step S106 is executed by selecting the data having the smallest reference symbol for the output-side memory to be the destination.

One cycle of the processing is completed by performing the series of steps of processing from Step S103 to Step S106. The control station 1200 then repeats the processing from Step S102 and the subsequent steps.

As described above, the procedure of deriving the data readout order in the first embodiment has a feature in that the data to be read out is determined in order from the input-side memory having the fewest number of destinations of the data to be accumulated. As described above, by reading out data from the memories having a larger number of destinations later, it is possible to read out the data without duplicating the destinations of the data that has already been read out.

In other words, taking the matrix information shown in FIG. 5 as an example, based on the procedure 1, the input-side memory 2211, in which the number of destinations of the data to be accumulated is only two out of four output-side memories, is preferentially selected. Through employment of such a derivation procedure, the selection of input-side memory having fewer output-side memory options is performed later, and the occurrence of data collisions in each cycle due to selecting a duplicate destination can be avoided.

Therefore, a readout order derivation method can be established in which, for any cycle, a readout order pattern free from destination duplication can be completed more quickly and more reliably in a single trial than in an exhaustive search, namely, than in deriving as a brute force search. As a result, it is possible to stably reduce the delay required to read out data.

After deriving the data readout order for all subchannels, the control station 1200 adds the derivation result to a command signal, and transmits the command signal to the channelizer control unit 2400 in the channelizer relay unit 2000 via the telemetry/command link. Moreover, the channelizer control unit 2400 may acquire the derivation result of the readout order included in the command signal by receiving the command signal transmitted from the control station 1200 via the antenna 2003.

The channelizer control unit 2400 then sequentially reads out the subchannel data accumulated in each of the input-side memories 2211 to 2214 based on address control in every cycle in accordance with the acquired readout order derivation result. Each piece of read-out subchannel data is routed to the appropriate output-side port by the switch matrix 2209 based on connection control from the channelizer control unit 2400, and accumulated in order from the left in each of the output-side memories 2215 to 2218.

Figure 11B:
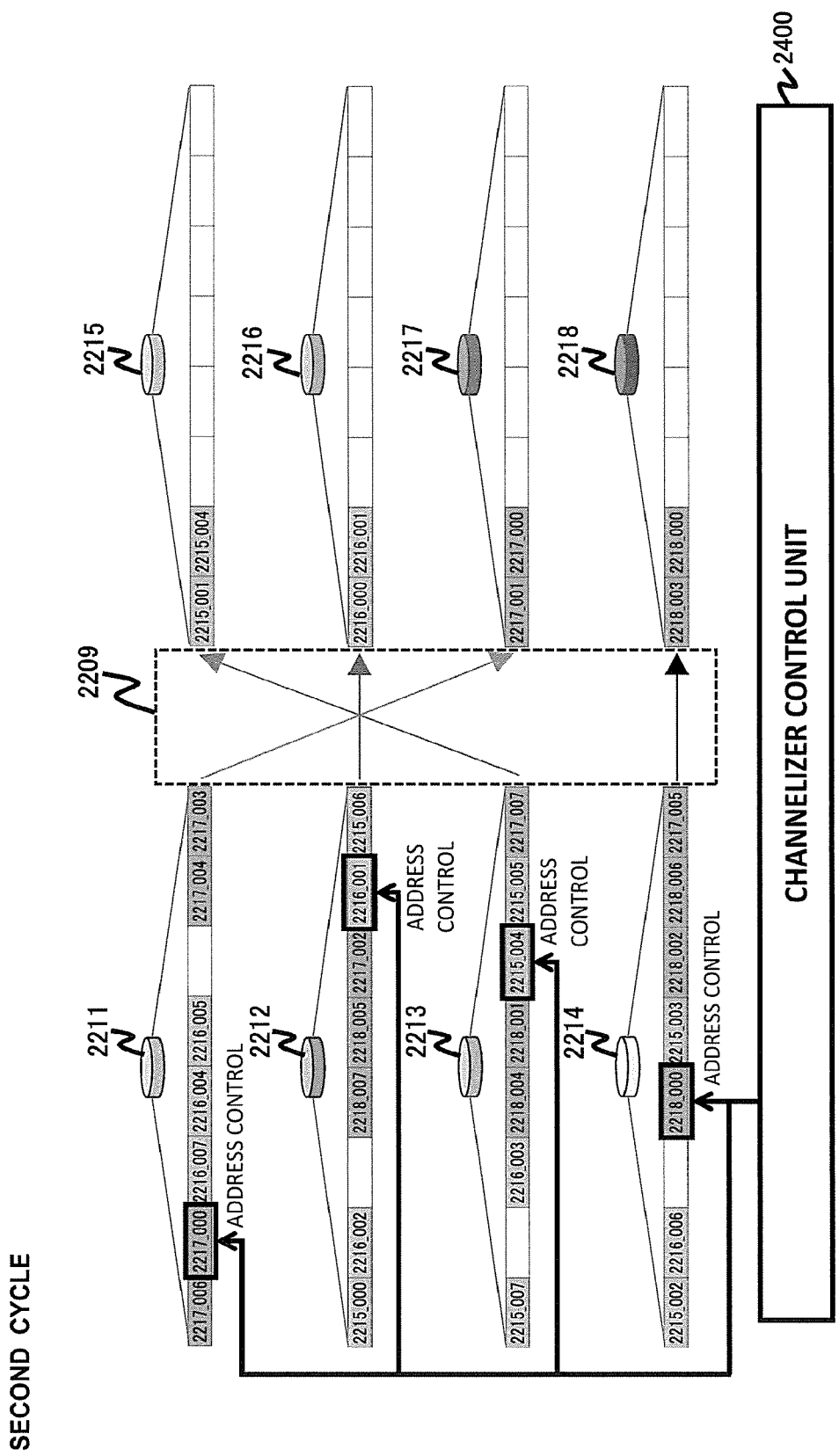
FIG. 11B is an explanatory diagram for illustrating a state in which the subchannel data accumulated in each input-side memory is accumulated in each output-side memory in the second cycle by executing address control by the channelizer control unit in the first embodiment of the present invention.

FIG. 11A to FIG. 11C are explanatory diagrams for illustrating a state in which the subchannel data accumulated in each of the input-side memories 2211 to 2214 is accumulated in each of the output-side memories 2215 to 2218 from the left every cycle by executing address control by the channelizer control unit 2400 in the first embodiment of the present invention.

More specifically, in FIG. 11A to FIG. 11C, there is illustrated a state in which the subchannel data accumulated in the input-side memories 2211 to 2214 shown in FIG. 4 have accumulated in each of the output-side memories 2215 to 2218 based on routing control by the channelizer control unit 2400 over eight cycles in accordance with the procedures 1 to 5. In FIG. 11A, a state in which the first cycle has ended is illustrated. In FIG. 11B, a state in which the second cycle has ended is illustrated. In FIG. 11C, a state in which the eighth cycle has ended is illustrated.

The subchannel data accumulated in this way in each of the output-side memories 2215 to 2218 is further read out based on address control from the channelizer control unit 2400, and output simultaneously from each of the output-side memories 2215 to 2218 in order of subchannel number. Therefore, through application of the procedure of deriving the data readout order in the present invention, the timing of reading out data from the switch unit 2200 is the same at all output ports. For this reason, the occurrence of a difference in delay during routing can be prevented.

As described above, there are provided a circuit configuration and a routing control method that can execute derivation of the data readout order in the first embodiment. As a result, even in a satellite communication system handling several tens of beams, it is possible to implement a low power consumption digital switch matrix having a small circuit size.

More specifically, in the first embodiment, there can be provided a method of deriving a selection procedure of input/output data that prevents the occurrence of a difference in delay for every routing and enables switch processing in such a short period of time that does not affect system operation, and a suitable digital switch configuration for implementing the selection procedure.

Second Embodiment

In the first embodiment described above, there is described a case in which the arithmetic processing for deriving the data readout order is executed on the control station 1200 side, and the channelizer control unit 2400 performs switch processing based on the derivation result obtained by the control station 1200. In contrast, a second embodiment of the present invention has a feature in that the arithmetic processing for deriving the data readout order is performed in the channelizer relay unit 2000.

In the second embodiment, the control station 1200 transmits only a command signal to instruct switching of the switch, or transmits only a command signal that combines the command to instruct switching of the switch with subchannel assignment information, to the channelizer control unit 2400 in the channelizer relay unit 2000.

In contrast, the channelizer control unit 2400 starts the derivation of the data readout order with the reception of the command signal as a trigger. The method of deriving the data readout order is the same as the method described in the first embodiment.

In the second embodiment, the control station 1200 may transmit only the command to instruct switching of the switch or only the command signal that combines the command to instruct switching of the switch with the subchannel assignment information. Therefore, as compared with the first embodiment described above, there is an advantage in that the radio resources of the telemetry/command link can be effectively utilized.

In order to implement the effects of the present invention, any one of the first embodiment and the second embodiment may be selected to be implemented, or both may be dynamically switched by mode switching or the like to be implemented.

Figure 12:
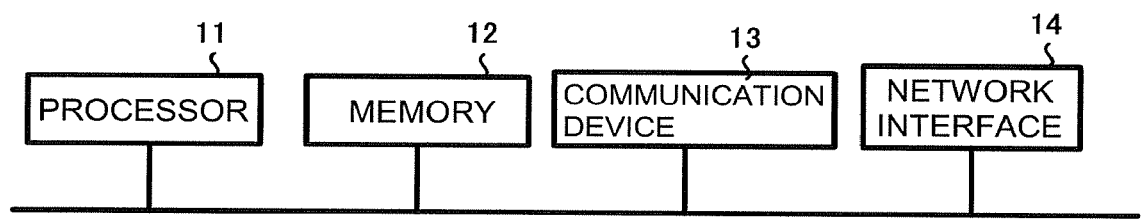
FIG. 12 is a diagram for illustrating a hardware configuration for implementing a control station according to the first embodiment or a second embodiment of the present invention, and a channelizer control unit in the second embodiment of the present invention.

There is now provided a supplementary description of the hardware configuration of the control station 1200 described in the first embodiment and the channelizer control unit 2400 described in the second embodiment. FIG. 12 is a diagram for illustrating a hardware configuration for implementing the control station 1200 according to the first embodiment or the second embodiment of the present invention, and the channelizer control unit 2400 in the second embodiment of the present invention.

For example, the control station 1200 according to the first embodiment or the channelizer control unit 2400 in the second embodiment can be implemented by the processing circuit illustrated in FIG. 12, specifically, a processing circuit including a processor 11, a memory 12, a communication device 13, and a network interface 14.

Specifically, the control station 1200 or the channelizer control unit 2400 is implemented by the processor 11 reading out from the memory 12 a program for operating as the control station 1200 or the channelizer control unit 2400 and executing the program.

In the case of implementing the control station 1200 by the processing circuit illustrated in FIG. 12, the communication device 13 is used when the control station 1200 communicates to and from the channelizer relay unit 2000 and the plurality of user terminals present in the beams 3000. The network interface 14 is used when the control station 1200 communicates to and from the GW station 1100 via the terrestrial network 1000.

Moreover, in the case of implementing the channelizer control unit 2400 by the processing circuit illustrated in FIG. 12, the communication device 13 is used when the channelizer control unit 2400 communicates to and from the control station 1200.

The network interface 14 is used when the channelizer control unit 2400 communicates to and from the demultiplexing units 2101 to 2104, the switch unit 2200, and the multiplexing units 2301 to 2304 via a line in the channelizer relay unit 2000.

The processor 11 is, for example, a central processing unit (CPU, also referred to as "central processor", processing unit", "arithmetic unit", "microprocessor", "microcomputer", processor, and DSP), or a system large-scale integration (LSI).

The memory 12 is a nonvolatile or volatile semiconductor memory such as a random-access memory (RAM), a read-only memory (ROM), or an electrically erasable programmable read-only memory (EEPROM), or a magnetic disk, a flexible disk, an optical disc, a compact disc, a mini disc, a digital versatile disc (DVD), and the like.

The configurations described in the above-mentioned first and the second embodiments are given as an example of the specifics of the present invention, and can be combined with other known technologies. Further, part of the configurations may be omitted or modified without departing from the spirit of the present invention. The first and second embodiments of the present invention are not limited to a satellite communication system or to devices constructing a satellite communication system, and can be applied to other wireless communication devices and digital switches for such wireless communication devices.

One example thereof is an exchanger of a terrestrial cellular base station. Such an exchanger is configured to perform switching for connecting terminals in the same cell or between different cells via a base station covering a plurality of cells (communication areas). Therefore, the data to be switched is not required to be a subchannel described in the first and second embodiments, and may be any time-division multiplexed data.

The switching processing in the present invention is also applicable to data other than subchannel data described in the first and second embodiments. For example, the switching processing may be performed in units of packets configured from a plurality of data sequences.

Third Embodiment

In the first embodiment described above, there is described a method of determining, in the process of buffering input data in the input-side memories and storing the data in the memories on the output port side via the switch matrix, a data readout order in which the destination (output-side memory) at the same transfer timing is not duplicated.

A data readout order algorithm like that described in the first embodiment is an effective method when the input port that is the transmission source and the output port that is the destination are in one-to-one communication (i.e., unicast). For example, when data of one-to-many communication (i.e., broadcast) is included, the data readout order algorithm described in the first embodiment may not always avoid destination duplication. Therefore, in a third embodiment of the present invention, there is described a data readout order algorithm that can also handle cases in which broadcast data is included. In the description of the drawings in the third embodiment, a memory 1 to a memory 4 correspond to input-side memories, and a memory 5 to a memory 8 correspond to output-side memories.

Figure 13A:
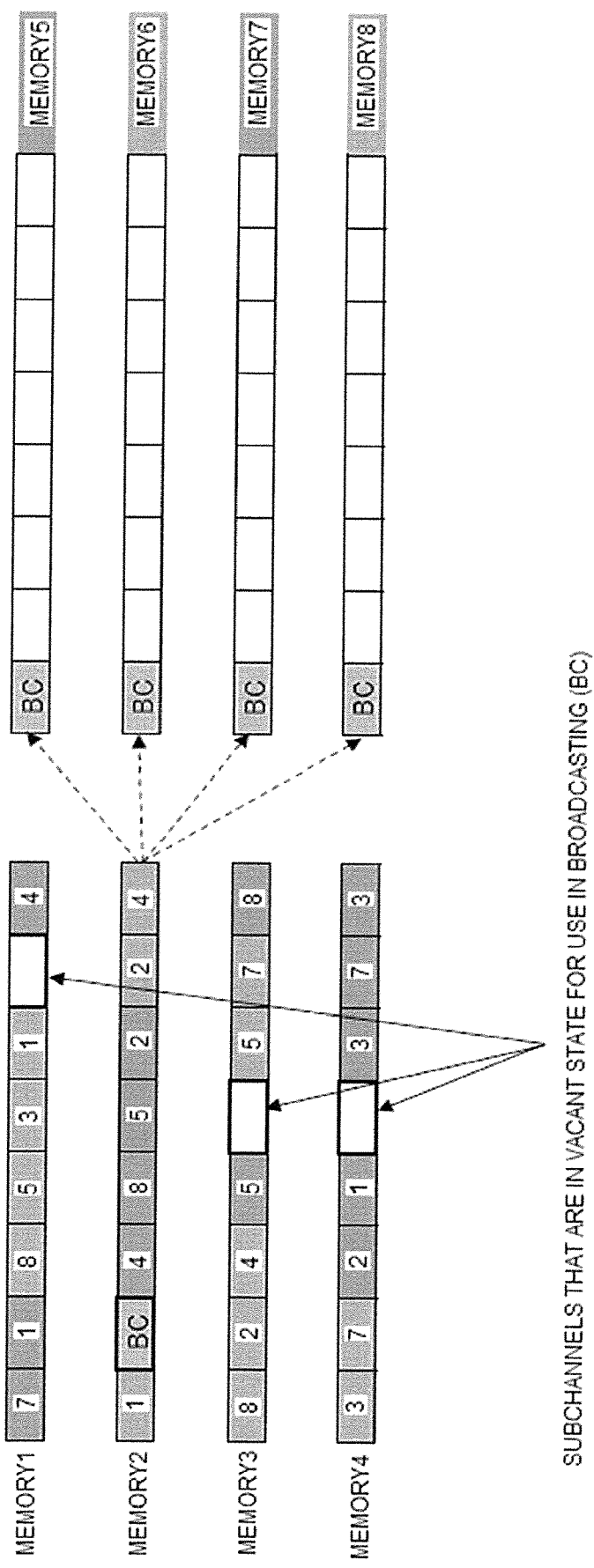
FIG. 13A is a diagram for illustrating a first example of a data readout order in a third embodiment of the present invention.

FIG. 13A is a diagram for illustrating a first example of a data readout order in the third embodiment of the present invention. In FIG. 13A, there is illustrated a case in which broadcast data BC is included in the input memory 2, and subchannels that are no longer required to be transmitted by broadcasting (are in a vacant state) are equally assigned to the other input memories 1, 3 and 4.

In such a case, duplication of the destinations can be avoided by reading out with the highest priority the subchannel to be broadcast, and at that timing, selecting a vacant subchannel for the other ports (i.e., data is not read out).

Figure 13B:
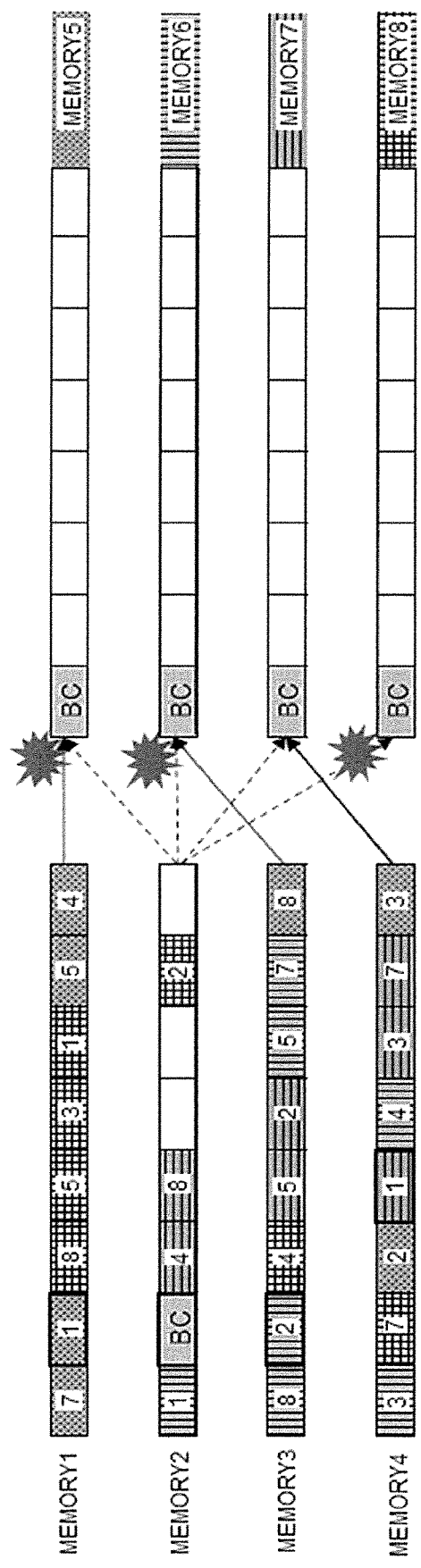
FIG. 13B is a diagram for illustrating a second example of a data readout order in the third embodiment of the present invention.

Next, FIG. 13B is a diagram for illustrating a second example of a data readout order in the third embodiment of the present invention. In FIG. 13B, there is illustrated a case in which broadcast data BC is included in the input memory 2, and three subchannels that are in a vacant state are also assigned to the input memory 2. In other words, FIG. 13B corresponds to a case in which subchannels that are in a vacant state are assigned in a biased manner.

In such a case, when reading out of the broadcast data BC is selected, a vacant subchannel may not be selected from the input ports other than the memory 2, and data readout always occurs. As a result, it becomes impossible to avoid destination duplication. Therefore, it is not possible to apply the data readout order algorithm described in the first embodiment as it is to the case like FIG. 13B.

Figure 14:
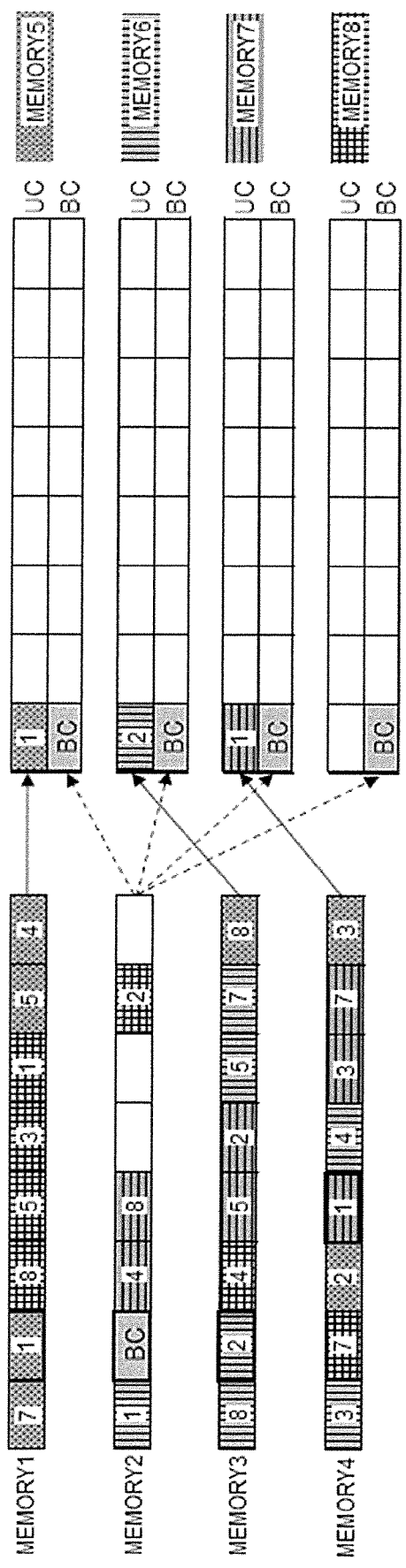
FIG. 14 is an explanatory diagram for illustrating a configuration in which the output-side memory has a dual-output configuration in the third embodiment of the present invention.

Therefore, in the third embodiment, in order to solve the problem of destination duplication like that illustrated in FIG. 13B, a dual-output configuration having two memories on the output port side is employed. FIG. 14 is an explanatory diagram for illustrating a dual output-side memory configuration in the third embodiment of the present invention.

As illustrated in FIG. 14, in the third embodiment, the configuration has separate output-side memories for unicast and for broadcast. With such a configuration, unicast data and broadcast data can be buffered in separate memories. As a result, even when another input port and a destination port are duplicated at the time of broadcasting, the memories themselves are separate, and hence the data can be buffered.

Figure 15:
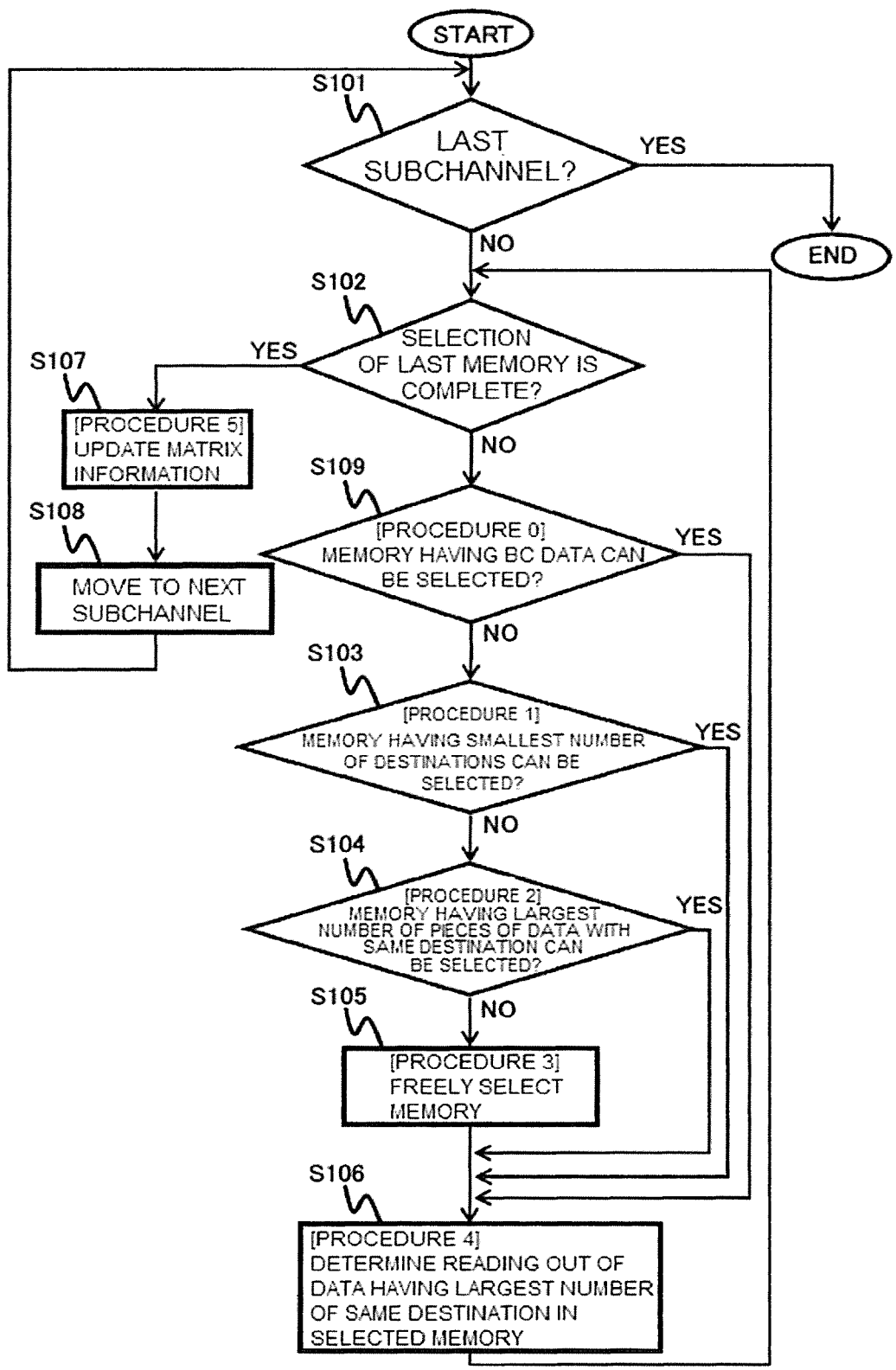
FIG. 15 is a flowchart for illustrating a procedure of deriving the readout order of subchannel data in the third embodiment of the present invention.

Next, there is described a procedure of deriving the readout order of the subchannel data in the third embodiment, which can be applied to cases in which the output-side memories have a dual-output configuration. FIG. 15 is a flowchart for illustrating the procedure of deriving the readout order of the subchannel data in the third embodiment of the present invention. The differences between the procedures illustrated in FIG. 15 and the flowchart illustrated in FIG. 10 described in the first embodiment are that [Procedure 0] of Step S109 is newly added to [Procedure 1] to [Procedure 5], and that in [Procedure 0] a memory having the broadcast data BC is selected as the readout source memory. Specifically, a memory having the broadcast data BC is preferentially selected as the readout source memory, and after the memory having the broadcast data BC is selected as the readout source memory, or in cases in which there is no memory having the broadcast data BC, the readout source memory is determined in accordance with the procedures described in the first embodiment.

In the case in which there are a plurality of selection candidates when the control station 1200 according to the third embodiment executes selection in [Procedure 4] of Step S106, that is, when there are a plurality of pieces of data having the largest number of the same destinations, the control station 1200 freely selects one piece of data. Specifically, in the third embodiment, one piece of data is selected from among a plurality of candidates by sequentially employing a first selection method and a second selection method described below.

First, as the first selection method, it is assumed that one piece of data is selected by prioritizing data addressed to the output-side memory that has been selected the least until now. When one piece of data is not determined by the first selection method, then, as the second selection method, the piece of data having the smallest reference symbol for the output-side memory to be the destination is selected. The free selection of [Procedure 4] of Step S106 is executed by such two-step selection processing.

More specifically, in the first embodiment described above, the free selection is executed by executing only the second selection method in Step S106. In contrast, in the third embodiment, in Step S106, the free selection is executed by executing the first selection method before the second selection method. As a result, it is possible to implement a data readout order algorithm that can handle cases in which broadcast data BC is included.

Next, a series of steps of processing of the data readout order algorithm that can handle even cases in which broadcast data BC is included are described through use of specific examples. FIG. 16A to FIG. 16J are explanatory diagrams for sequentially illustrating a series of steps of processing of the data readout order algorithm in the third embodiment of the present invention.

Figure 16C:
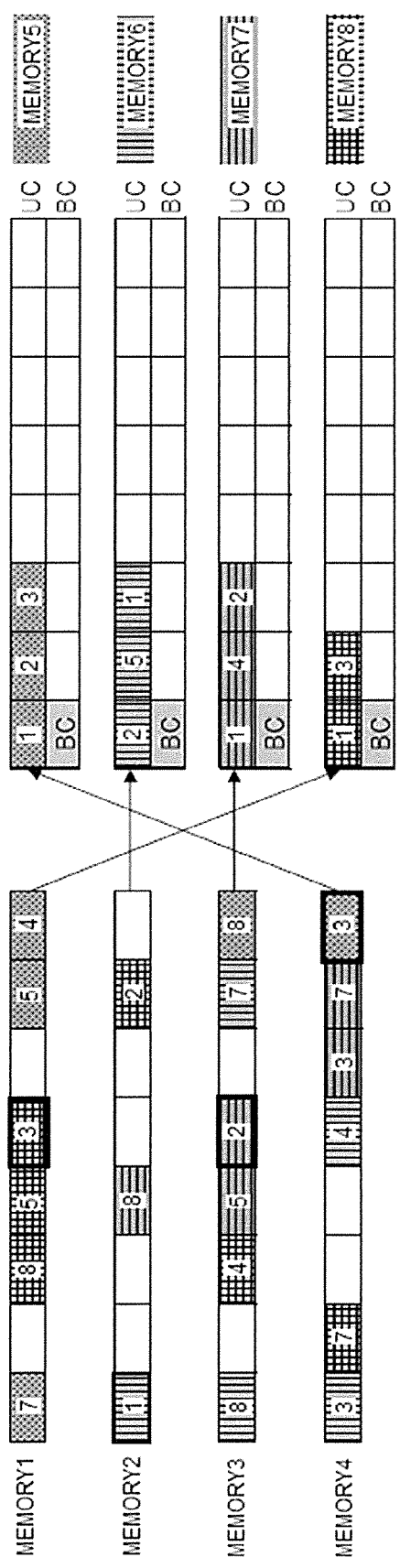
FIG. 16C is an explanatory diagram for illustrating a series of steps of processing of the data readout order algorithm in the third embodiment of the present invention.
Figure 16D:
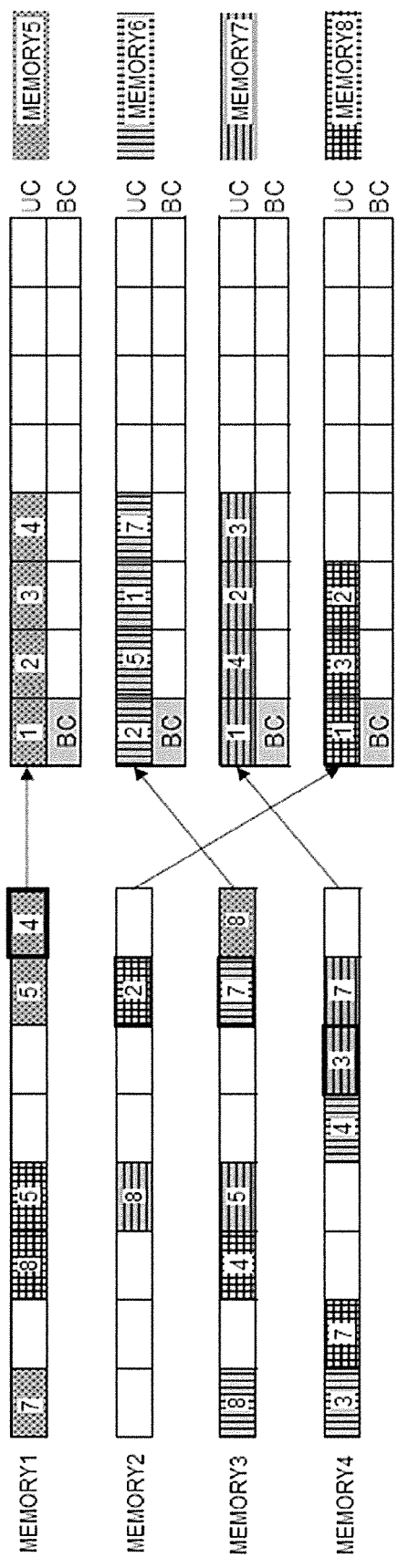
FIG. 16D is an explanatory diagram for illustrating a series of steps of processing of the data readout order algorithm in the third embodiment of the present invention.
Figure 16E:
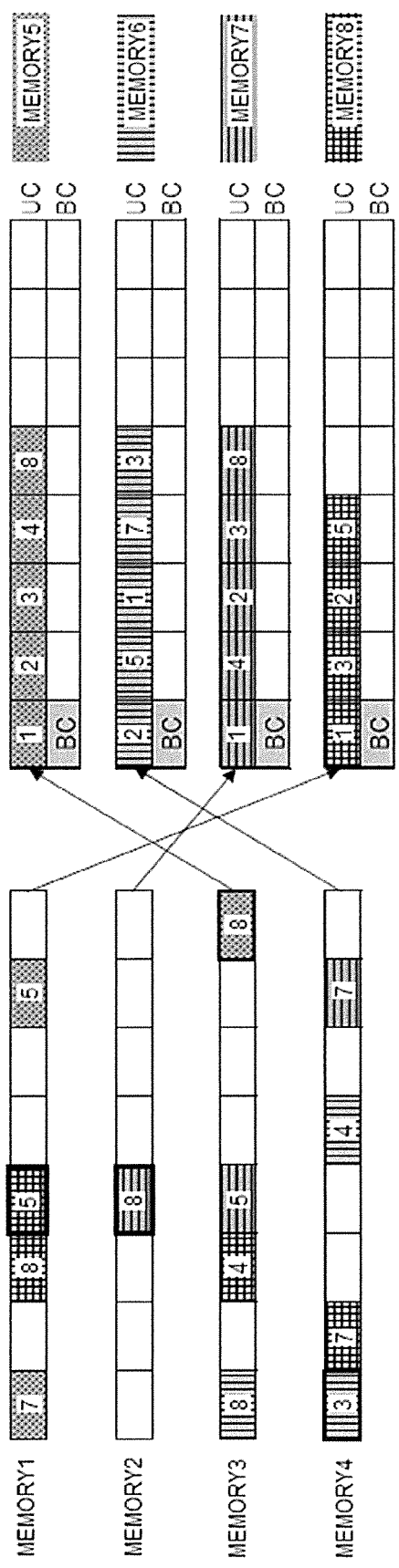
FIG. 16E is an explanatory diagram for illustrating a series of steps of processing of the data readout order algorithm in the third embodiment of the present invention.
Figure 16F:
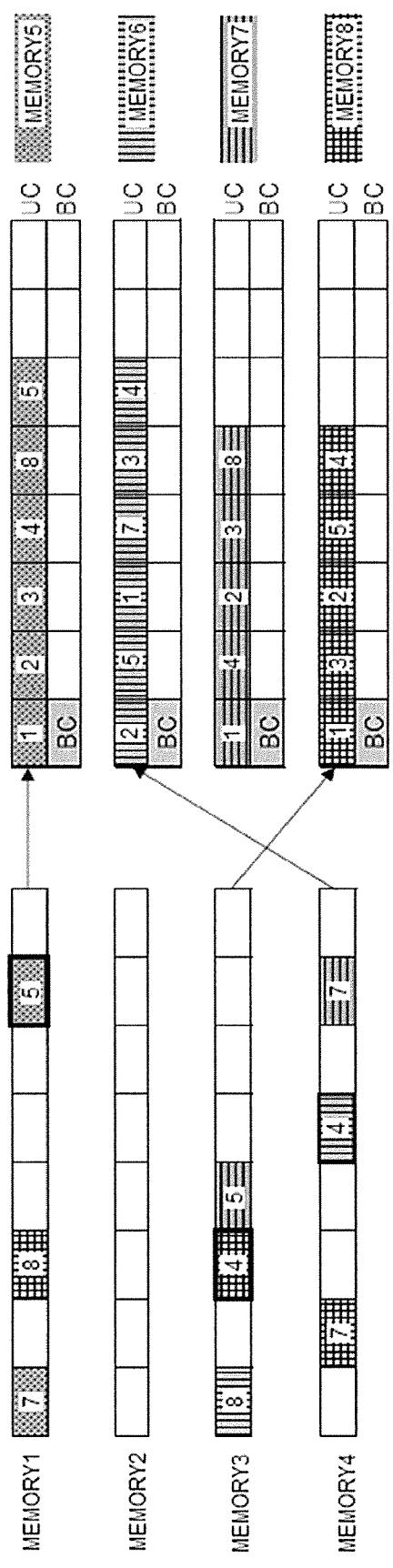
FIG. 16F is an explanatory diagram for illustrating a series of steps of processing of the data readout order algorithm in the third embodiment of the present invention.
Figure 16G:
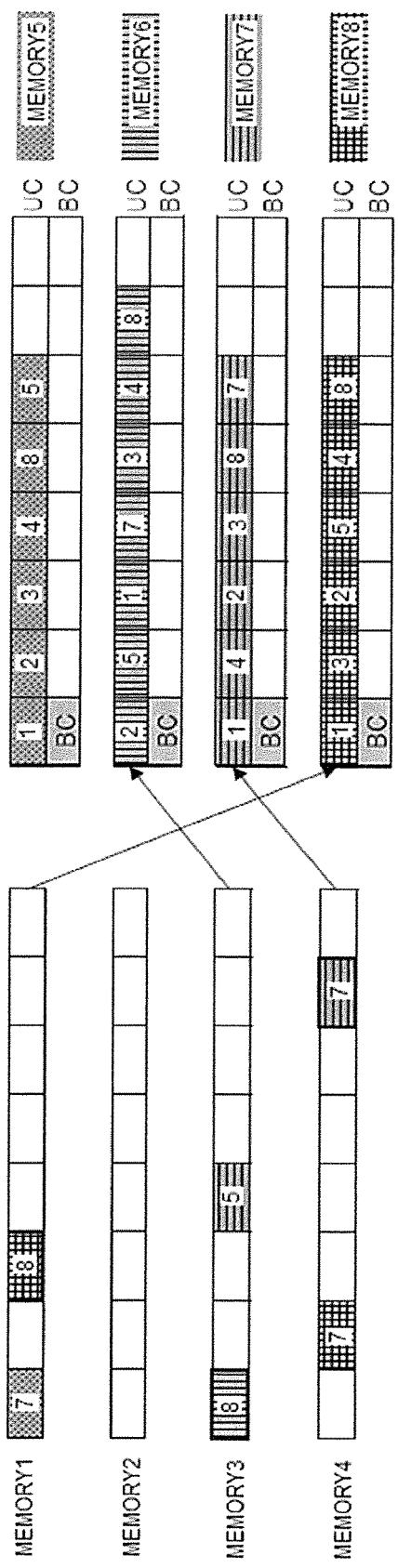
FIG. 16G is an explanatory diagram for illustrating a series of steps of processing of the data readout order algorithm in the third embodiment of the present invention.
Figure 16H:
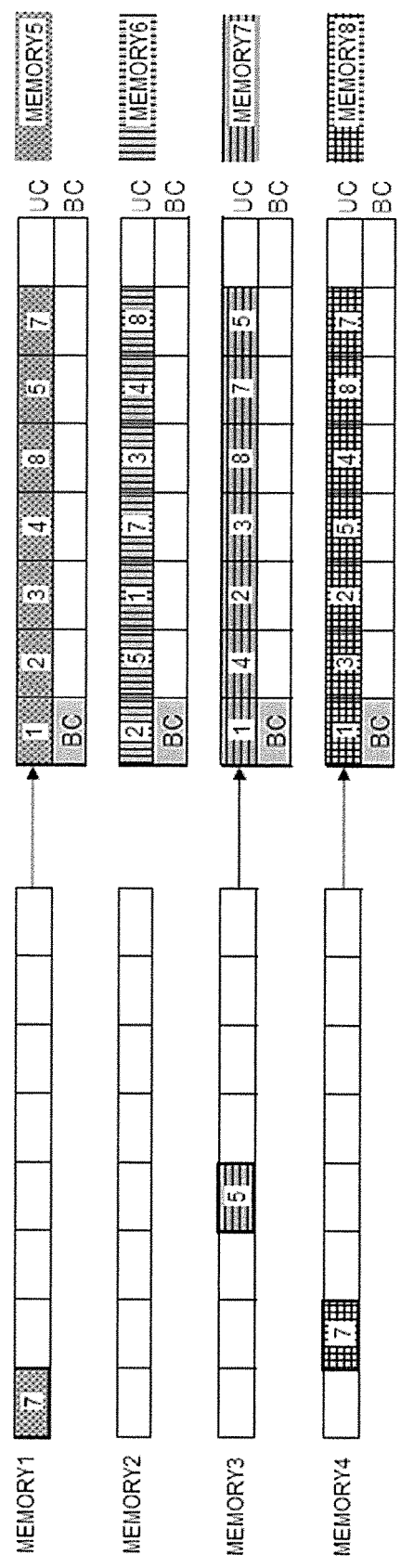
FIG. 16H is an explanatory diagram for illustrating a series of steps of processing of the data readout order algorithm in the third embodiment of the present invention.
Figure 16I:
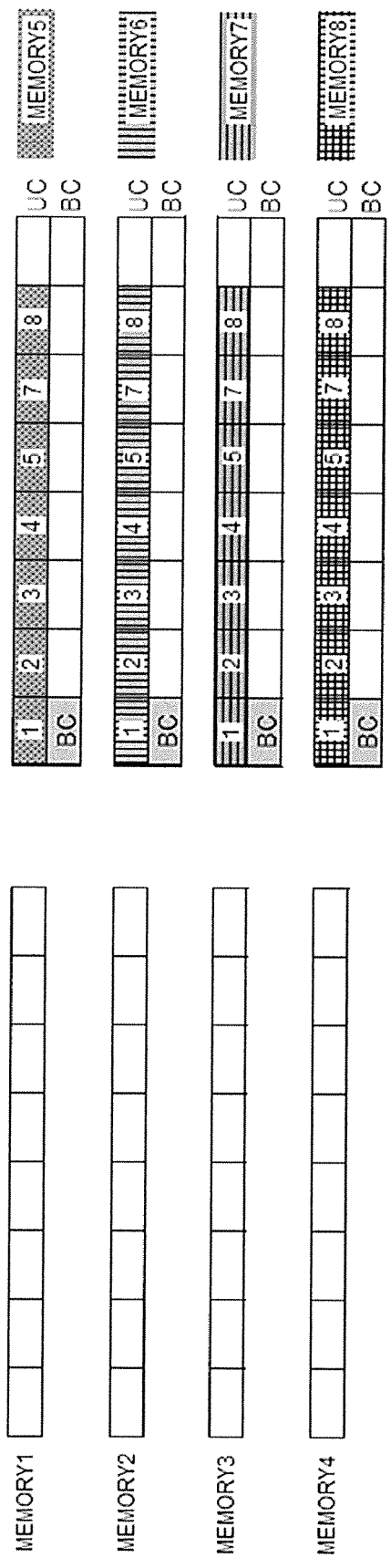
FIG. 16I is an explanatory diagram for illustrating a series of steps of processing of the data readout order algorithm in the third embodiment of the present invention.
Figure 16J:
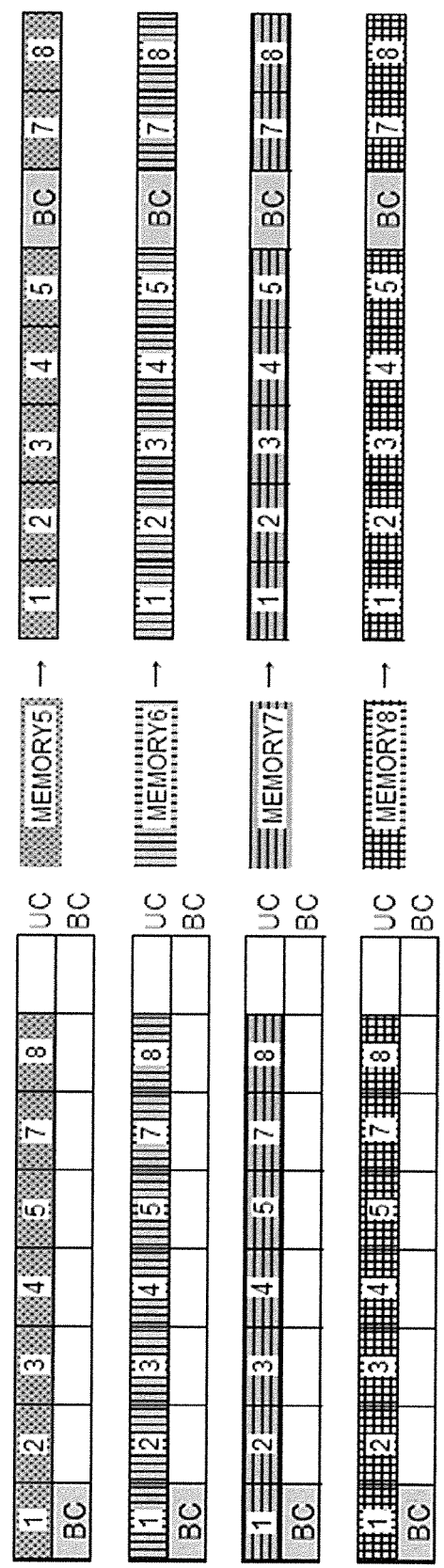
FIG. 16J is an explanatory diagram for illustrating a series of steps of processing of the data readout order algorithm in the third embodiment of the present invention.

In FIG. 16A to FIG. 16H, there are illustrated the data readout results from each of the first subchannel to the eighth subchannel. In FIG. 16I, there is illustrated a state in which the received data is rearranged in order of subchannels from the state of FIG. 16H. In FIG. 16J, there is illustrated a state in which broadcast data BC is output while being inserted into the subchannels from which the broadcast data BC is missing under the state of the output-side memories shown in FIG. 16I.

In FIG. 16A, data readout is performed based on a derivation procedure like that described below by executing processing based on the flowchart illustrated in FIG. 15.

First cycle: [Procedure 0] of Step S109 is applied, and broadcast data BC addressed to the memories 5 to 8 is read out from the memory 2.

Second cycle: The memory 1 is selected as the readout source memory by [Procedure 1] of Step S103, and the data addressed to the memory 5 is read out from the memory 1.

Third cycle: The memory 3 is selected as the readout source memory by [Procedure 2] of Step S104, and the data addressed to the memory 6 is read out from the memory 3.

Fourth cycle: The memory 4, which is the last remaining memory, is selected as the readout source memory, and the data addressed to the memory 7 is read out from the memory 4.

In FIG. 16B, data readout is performed based on a derivation procedure like that described below by executing processing based on the flowchart illustrated in FIG. 15. At this stage, there is no memory having broadcast data BC, and hence the selection of the readout source memory by [Procedure 0] of Step S109 is not performed.

First cycle: The memory 1 is selected as the readout source memory by [Procedure 1] of Step S103, and the data addressed to the memory 8 is read out from the memory 1.

Second cycle: The memory 2 is selected as the readout source memory by [Procedure 1] of Step S103, and the data addressed to the memory 7 is read out from the memory 2.

Third cycle: The memory 3 is selected as the readout source memory by [Procedure 2] of Step S104, and the data addressed to the memory 6 is read out from the memory 3.

Fourth cycle: The memory 4, which is the last remaining memory, is selected as the readout source memory, and the data addressed to the memory 5 is read out from the memory 4.

In the following FIG. 16C, data readout is performed based on a derivation procedure like that described below by executing processing based on the flowchart illustrated in FIG. 15.

First cycle: The memory 1 is selected as the readout source memory by [Procedure 1] of Step S103. At this time, as the data to be read out from the memory 1, the data addressed to the memory 8 is selected based on the first selection method in the case in which there are a plurality of selection candidates in [Procedure 4] of Step S106. In the first embodiment, the data addressed to the memory 1 having the smallest reference symbol has been selected.

Second cycle: The memory 2 is selected as the readout source memory by [Procedure 1] of Step S103. At this time, the data to be stored in the memory 2 is the data addressed to the memory 6 and the memory 7, and both the memory 6 and the memory 7 have been selected twice as the destination so far. Therefore, the data addressed to the memory 6 is selected based on the second selection method in the case in which there are a plurality of selection candidates in [Procedure 4] of Step S106.

Third cycle: The memory 3 is selected as the readout source memory by [Procedure 3] of Step S105, and the data addressed to the memory 7 is read out from the memory 3.

Fourth cycle: The memory 4, which is the last remaining memory, is selected as the readout source memory, and the data addressed to the memory 5 is read out from the memory 4.

Thereafter, in FIG. 16D to FIG. 16H as well, the readout source memory (input-side memory) and the readout target (output-side memory) are selected by the same procedures.

Finally, as illustrated in FIG. 16I and FIG. 16J, the subchannel data and the broadcast data BC accumulated in each of the output-side memories 5 to 8 are further read out based on address control from the channelizer control unit 2400, and are output simultaneously from each of the output-side memories 5 to 8 in order of subchannel number.

As described above, in the third embodiment, it is possible to implement a data readout order algorithm that can handle cases in which broadcast data BC is included by employing a dual-output configuration for the output-side memories and executing the procedures illustrated in the flowchart of FIG. 15. The flowchart of FIG. 15 in the third embodiment encompasses the flowchart of FIG. 10 in the first embodiment, and hence it is to be understood that the data readout order derivation algorithm in the third embodiment can also be applied to the first embodiment.

REFERENCE SIGNS LIST

11 processor, 12 memory, 13 communication device, 14 network interface, 1000 terrestrial network, 1100 gateway station, 1101 antenna, 1200 control station, 2000 channelizer relay unit, 2001 antenna, 2001a transmission antenna (feeder link transmission antenna), 2001b reception antenna (feeder link reception antenna), 2002 antenna, 2002a transmission antenna (user link transmission antenna), 2002b reception antenna (user link reception antenna), 2003 antenna, 2101 to 2104 demultiplexing unit, 2200 switch unit, 2201 to 2204 input port, 2205 to 2208 output port, 2209 switch matrix, 2211 to 2214 input-side memory, 2215 to 2218 output-side memory, 2301 to 2304 multiplexing unit, 2400 channelizer control unit

The invention claimed is:

1. A satellite communication system, comprising:
a digital switch of a satellite channelizer and a control unit, wherein the digital switch of the satellite channelizer comprises:
  a plurality of input-side memories, which are arranged in a one-to-one correspondence with a plurality of input ports, and are configured to accumulate time-division multiplexed data acquired in units of input ports;
  a plurality of output-side memories, which are arranged in a one-to-one correspondence with a plurality of output ports, and are configured to accumulate time-division multiplexed data to be output in units of output ports; and
  a switch matrix, which is arranged between the plurality of input-side memories and the plurality of output-side memories, and is configured to receive, as input, the time-division multiplexed data read out in every cycle from each of the plurality of input-side memories, and execute routing for selecting, in accordance with a connection control signal received from outside, any one of the plurality of output-side memories such that the time-division multiplexed data read out in every cycle is output from each of the plurality of output ports without causing a difference in delay, to output the time-division multiplexed data,
  each of the plurality of output-side memories having a dual-output configuration,
  the switch matrix being configured to select any one of the plurality of output-side memories based on the read-out time-division multiplexed data,
wherein the control unit is configured to execute, when executing first address control of reading out, in every cycle, suitable data from among pieces of time-division multiplexed data accumulated in the plurality of input-side memories, connection control of outputting the connection control signal to the switch matrix in order to execute the routing, and second address control of reading out the time-division multiplexed data accumulated in the plurality of output-side memories by performing the connection control in order of an output number to output the read-out time-division multiplexed data via the plurality of output ports, the first address control, the connection control, and the second address control in accordance with an input/output rule enabling the time-division multiplexed data to be output without causing a difference in delay at each of the plurality of output ports, wherein each of the plurality of output-side memories has a dual-output configuration including an output-side memory for unicast and an output-side memory for broadcast and wherein the switch matrix is configured to select the output-side memory for unicast when the read-out time-division multiplexed data is data for unicast, and to select the output-side memory for broadcast when the read-out time-division multiplexed data is data for broadcast.

2. The satellite communication system according to claim 1, wherein the control unit is configured to execute the first address control, the connection control, and the second address control in accordance with the input/output rule defined such that the time-division multiplexed data individually read out from each of the plurality of input-side memories in every cycle is inhibited from being output in a duplicated manner to the same output-side memory in the same cycle, and is individually output to each of the plurality of output-side memories.

3. The satellite communication system according to claim 2, wherein each of the pieces of time-division multiplexed data accumulated in the plurality of input-side memories includes information on one of the plurality of output-side memories and the output number, and wherein the control unit is configured to:
  generate matrix information in which (input-side memory, output-side memory) is an element from the time-division multiplexed data accumulated in the plurality of input-side memories; and
  execute the first address control, the connection control, and the second address control in accordance with the input/output rule defined by:
    a procedure 1 of referring to the matrix information and selecting, as a readout source memory, an input-side memory having the smallest number of output-side memory destinations from among pieces of data accumulated in the plurality of input-side memories;
    a procedure 2 of selecting, as the readout source memory, when one readout source memory is not determined in the procedure 1, an input-side memory having the largest number of pieces of data with the same output-side memory destination from among a plurality of input-side memories selected in the procedure 1;
    a procedure 3 of freely selecting, when one input-side memory is not determined in the procedure 2, one readout source memory from among a plurality of input-side memories selected in the procedure 2;
    a procedure 4 of selecting, as a readout target memory, an output-side memory for which the data has the largest number of destinations from among pieces of data accumulated in the input-side memory selected as the readout source memory in any of the procedure 1 to the procedure 3;
    a procedure 5 of performing one cycle of selection of the readout source memory and the readout target memory by repeating the procedure 1 to the procedure 4 such that the time-division multiplexed data individually read out in one cycle from each of the plurality of input-side memories is individually output to a corresponding one of the plurality of output-side memories, and updating the matrix information by subtracting one from each element (input-side memory, output-side memory) of the matrix information corresponding to (calling source memory, calling target memory) selected in one cycle; and
    a procedure 6 of repeating the procedure 1 to the procedure 5 based on the updated matrix information to complete the selection of the calling source memory and the calling target memory for all cycles of the data accumulated in the plurality of input-side memories.

4. The satellite communication system according to claim 3, wherein the control unit is configured to:
  receive the input/output rule defined by the procedure 1 to the procedure 6 from a control station configured to manage communication traffic, in place of determining the input/output rule by the control unit; and
  execute the first address control, the connection control, and the second address control in accordance with the input/output rule received from the control station.

5. The satellite communication system according to claim 1, further comprising:
  a demultiplexing circuit configured to demultiplex a signal acquired via a reception antenna into a plurality of pieces of subchannel data, and to output, as time-division multiplexed data, the plurality of pieces of subchannel data to the plurality of input ports of the digital switch; and
  a multiplexing circuit configured to receive, as a plurality of pieces of subchannel data, the time-division multiplexed data output from the plurality of output ports, multiplex the received time-division multiplexed data, and then output the multiplexed time-division multiplexed data via a transmission antenna.

6. A control station, which is configured to manage communication traffic, the control station comprising an input/output rule generator configured to provide the input/output rule to the satellite communication system of claim 1, the input/output rule generator being configured to:
  generate matrix information in which (input-side memory, output-side memory) is an element from time-division multiplexed data, which is accumulated in a plurality of input-side memories included in the digital switch and includes information on an output-side memory and an output number; and
  generate the input/output rule and provide the generated input/output rule to the satellite communication system, the input/output rule being defined by:
    a procedure 1 of referring to the matrix information and selecting, as a readout source memory, an input-side memory having the smallest number of output-side memory destinations from among pieces of data accumulated in the plurality of input-side memories;
    a procedure 2 of selecting, as the readout source memory, when one readout source memory is not determined in the procedure 1, an input-side memory having the largest number of pieces of data with the same output-side memory destination from among a plurality of input-side memories selected in the procedure 1;
    a procedure 3 of freely selecting, when one input-side memory is not determined in the procedure 2, one readout source memory from among a plurality of input-side memories selected in the procedure 2;

a procedure 4 of selecting, as a readout target memory, an output-side memory for which the data has the largest number of destinations from among pieces of data accumulated in the input-side memory selected as the readout source memory in any one of the procedure 1 to the procedure 3;

a procedure 5 of performing one cycle of selection of the readout source memory and the readout target memory by repeating the procedure 1 to the procedure 4 such that the time-division multiplexed data individually read out in one cycle from each of the plurality of input-side memories is individually output to a corresponding one of the plurality of output-side memories, and updating the matrix information by subtracting one from each element (input-side memory, output-side memory) of the matrix information corresponding to (calling source memory, calling target memory) selected in one cycle; and a procedure 6 of repeating the procedure 1 to the procedure 5 based on the updated matrix information to complete the selection of the calling source memory and the calling target memory for all cycles of the data accumulated in the plurality of input-side memories.

7. A wireless communication control method to be executed in a wireless communication device, the wireless communication device including:
a plurality of input-side memories, which are arranged in a one-to-one correspondence with a plurality of input ports, and are configured to accumulate time-division multiplexed data acquired in units of input ports;

a plurality of output-side memories, which are arranged in a one-to-one correspondence with a plurality of output ports; and are configured to accumulate time-division multiplexed data to be output in units of output ports;

a switch matrix, which is arranged between the plurality of input-side memories and the plurality of output-side memories, and is configured to receive, as input, the time-division multiplexed data read out in every cycle from each of the plurality of input-side memories, and execute routing for selecting, in accordance with a connection control signal received from outside, any one of the plurality of output-side memories such that the time-division multiplexed data read out in every cycle is output from each of the plurality of output ports without causing a difference in delay, to output the time-division multiplexed data; and a control unit configured to execute first address control of reading out, in every cycle, suitable data from among pieces of time-division multiplexed data accumulated in the plurality of input-side memories, connection control of outputting the connection control signal to the switch matrix in order to execute the routing, and second address control of reading out the time-division multiplexed data accumulated in the plurality of output-side memories by performing the connection control in order of an output number to output the read-out time-division multiplexed data via the plurality of output ports, each of the plurality of output-side memories having a dual-output configuration including an output-side memory for unicast and an output-side memory for broadcast, the switch matrix being configured to select the output-side memory fir unicast when the read-out time-division multiplexed data is data for unicast, and to select the output-side memory for broadcast when the read-out time-division multiplexed data is data for broadcast, the wireless communication control method, which is executed by the control unit, comprising a control step of executing the first address control, the connection control, and the second address control in accordance with an input/output rule enabling the time-division multiplexed data to be output without causing a difference in delay at each of the plurality of output ports.

8. The wireless communication control method according to claim 7, wherein the control step includes executing the first address control, the connection control, and the second address control in accordance with the input/output rule defined such that the time-division multiplexed data individually read out from each of the plurality of input-side memories in every cycle is inhibited from being output in a duplicated manner to the same output-side memory in the same cycle, and is individually output to each of the plurality of output-side memories.

9. The wireless communication control method according to claim 8, wherein each of the pieces of time-division multiplexed data accumulated in the plurality of input-side memories includes information on one of the plurality of output-side memories and the output number, and wherein the control step includes executing the first address control, the connection control, and the second address control in accordance with the input/output rule defined by:

a first step of generating matrix information in which (input-side memory, output-side memory) is an element from the time-division multiplexed data accumulated in the plurality of input-side memories;

a second step of referring to the matrix information and selecting, as a readout source memory, an input-side memory having the smallest number of output-side memory destinations from among pieces of data accumulated in the plurality of input-side memories;

a third step of selecting, as the readout source memory, when one readout source memory is not determined in the second step, an input-side memory having the largest number of pieces of data with the same output-side memory destination from among a plurality of input-side memories selected in the second step;

a fourth step of freely selecting, when one input-side memory is not determined in the third step, one readout source memory from among a plurality of input-side memories selected in the third step;

a fifth step of selecting, as a readout target memory, an output-side memory for which the data has the largest number of destinations from among pieces of data accumulated in the input-side memory selected as the readout source memory in any of the second step to the fourth step;

a sixth step of performing one cycle of selection of the readout source memory and the readout target memory by repeating the second step to the fifth step such that the time-division multiplexed data individually read out in one cycle from each of the plurality of input-side memories is individually output to a corresponding one of the plurality of output-side memories, and updating the matrix information by subtracting one from each element (input-side memory, output-side memory) of the matrix information corresponding to (calling source memory, calling target memory) selected in one cycle; and a seventh step of repeating the second step to the sixth step based on the updated matrix information to complete the selection of the calling source memory and the calling target memory for all cycles of the data accumulated in the plurality of input-side memories.

* * * * *